United States Patent [19]

Behera

[11] Patent Number: 5,287,497
[45] Date of Patent: Feb. 15, 1994

[54] IMAGE STATEMENT PRINTING SYSTEM WITH DOCUMENT STORAGE/RETRIEVAL USING OPTICAL MEDIA

[75] Inventor: Bailochan Behera, Farmington Hills, Mich.

[73] Assignee: Unisys Corporation, Blue Bell, Pa.

[21] Appl. No.: 670,541

[22] Filed: Mar. 15, 1991

[51] Int. Cl.$^5$ ............................................. G06F 15/30
[52] U.S. Cl. .................................... 395/600; 395/425; 382/7; 364/DIG. 2; 364/918; 364/918.2; 364/962; 364/962.3; 364/964; 364/964.2; 364/964.3
[58] Field of Search ................. 395/600, 425; 382/7, 382/1; 369/30, 34; 235/3

[56] References Cited

U.S. PATENT DOCUMENTS

| | | | |
|---|---|---|---|
| 4,760,526 | 7/1988 | Takeda et al. | 395/600 |
| 4,918,646 | 4/1990 | Hirose | 395/600 |
| 4,941,125 | 7/1990 | Boyne | 395/600 |
| 4,987,533 | 1/1991 | Clark et al. | 369/36 X |
| 5,109,439 | 4/1992 | Froessl | 382/61 |
| 5,163,148 | 11/1992 | Walls | 395/600 |
| 5,187,750 | 2/1993 | Behera | 382/7 |

OTHER PUBLICATIONS

Einberger, J. W., "CD-ROM as a Mass Storage Device," Ninth IEEE Symposium on Mass Storage Systems, 1988, pp. 125-129.

Thompson, M. A., et al., "The Operation and Use of a 2 Terabyte Optical Archival Store," Ninth IEEE Symposium on Mass Storage Systems, 1988, pp. 88-92.

Narayan, Ajit, "A 30 Terabyte Mass Storage Architecture," Ninth IEEE Symposium on Mass Storage Systems, 1988, pp. 103-107.

Sherman, Chris, "The CD Rom Handbook," 1988 by Multiscience Press, Inc., pp. 309-329; 343-363.

*Primary Examiner*—Paul V. Kulik
*Attorney, Agent, or Firm*—Alfred W. Kozak; Mark T. Starr

[57] ABSTRACT

A storage/retrieval system providing a two month digital data accumulation in archival storage and a one month digital data accumulation storage (for monthly statements) of document images and information. A Master Print Index File correlates data on each document with its digital counterpart located on a specific optical platter and specific record number on the platter. The Master Print Index File is sorted and provided to a print subsystem which can access, on a daily basis, the needed digital image data from its magnetic disk after the magnetic disk has copied the current cycle of image data from the optical platters.

10 Claims, 12 Drawing Sheets

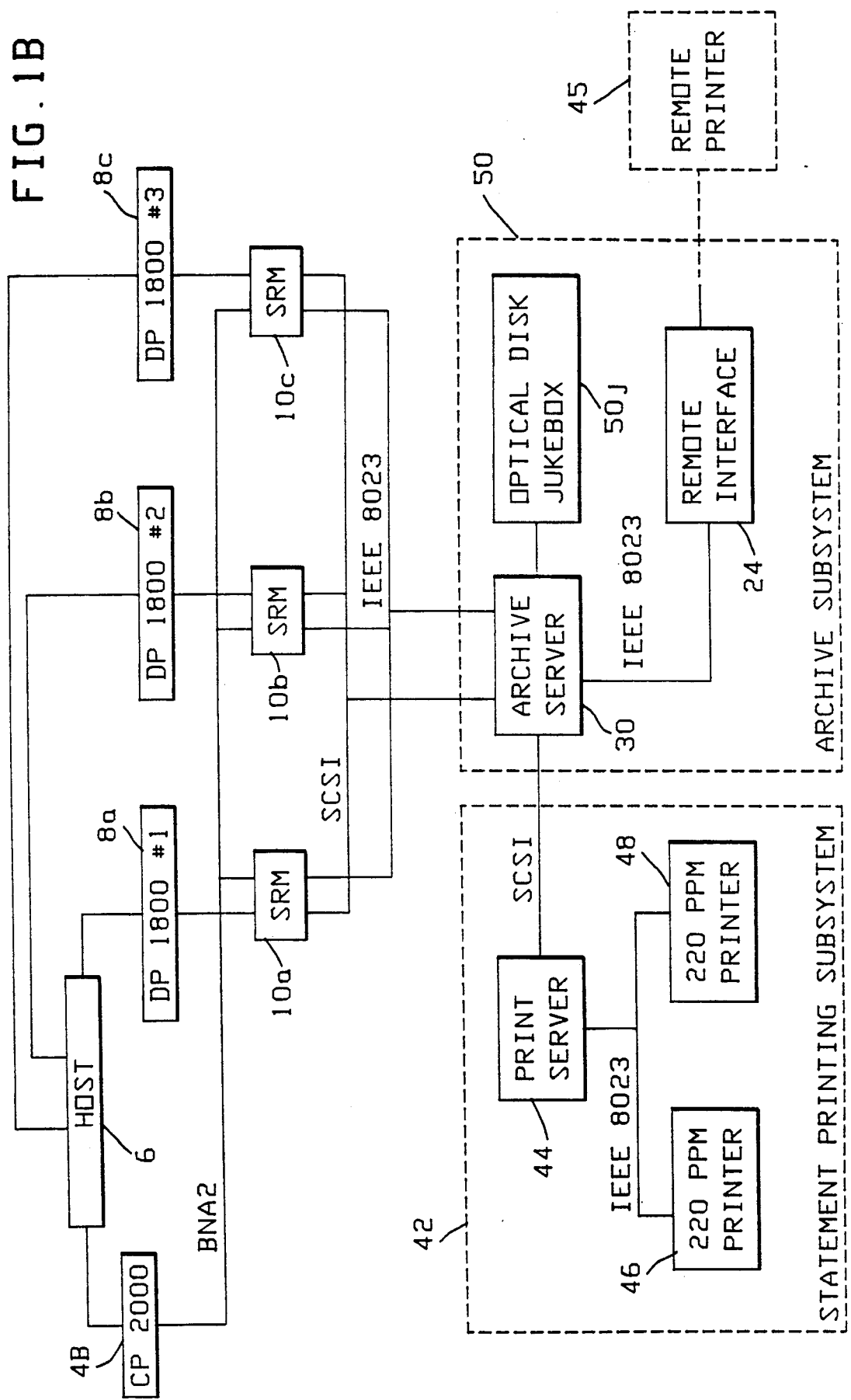

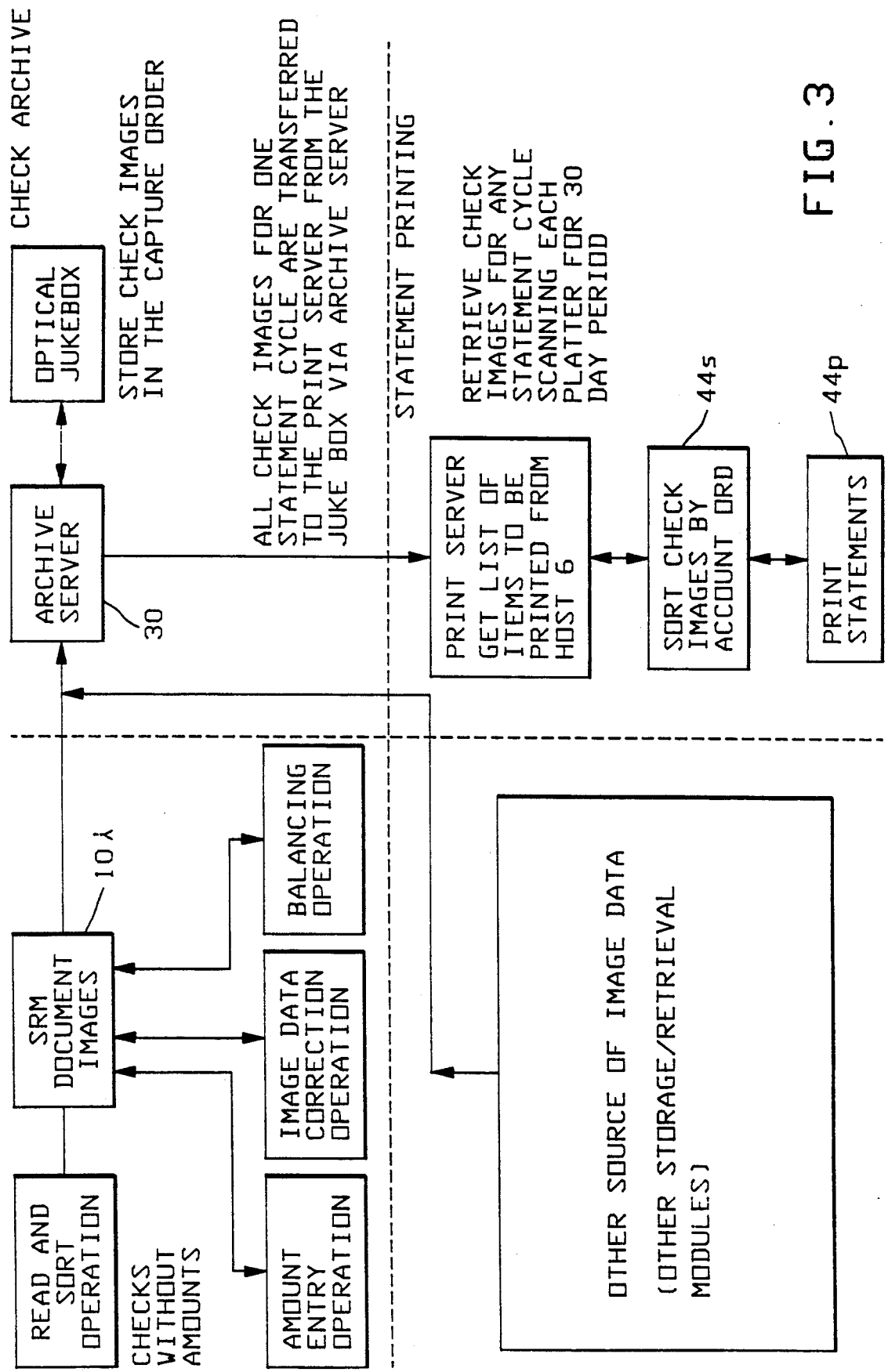

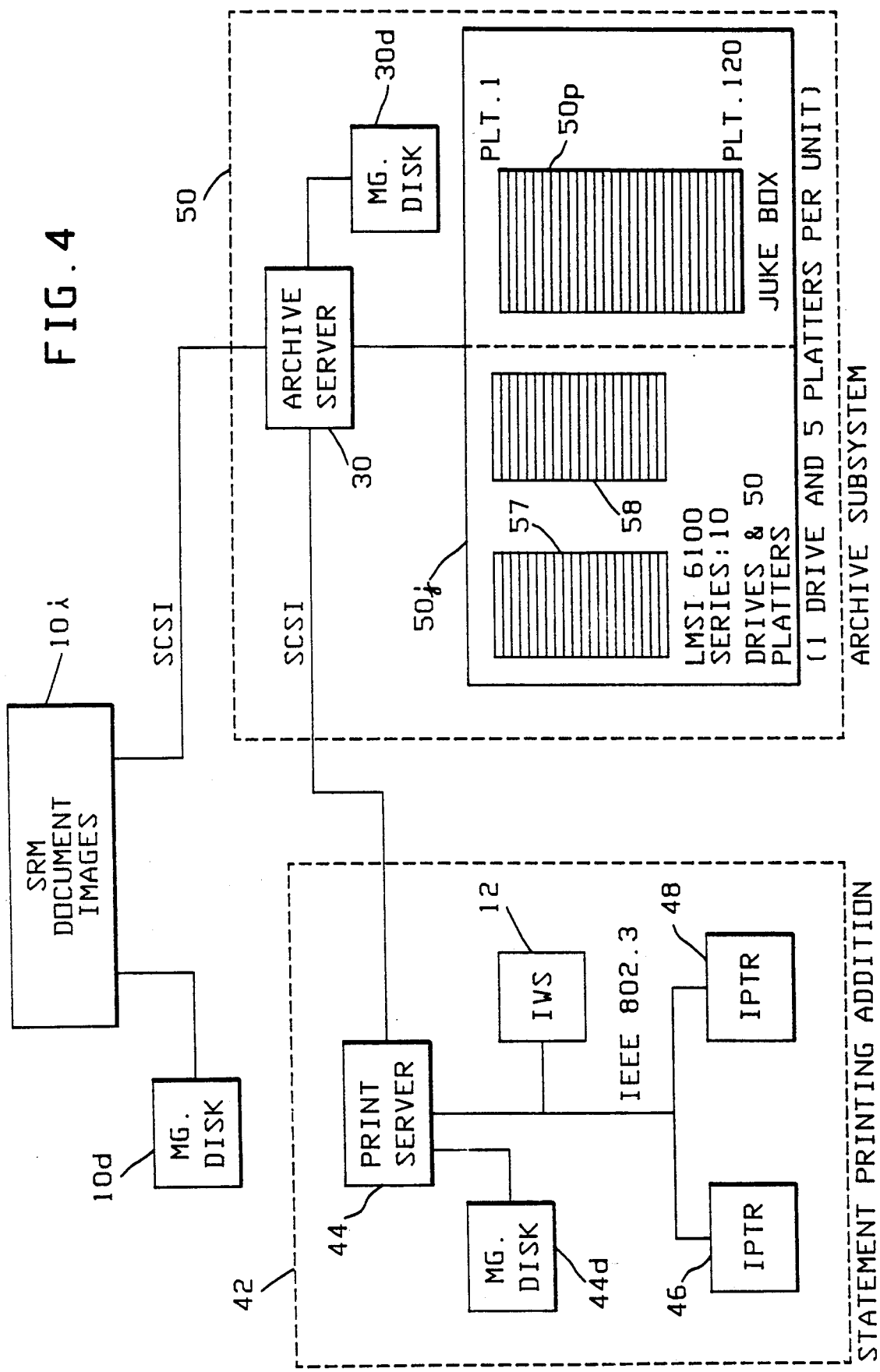

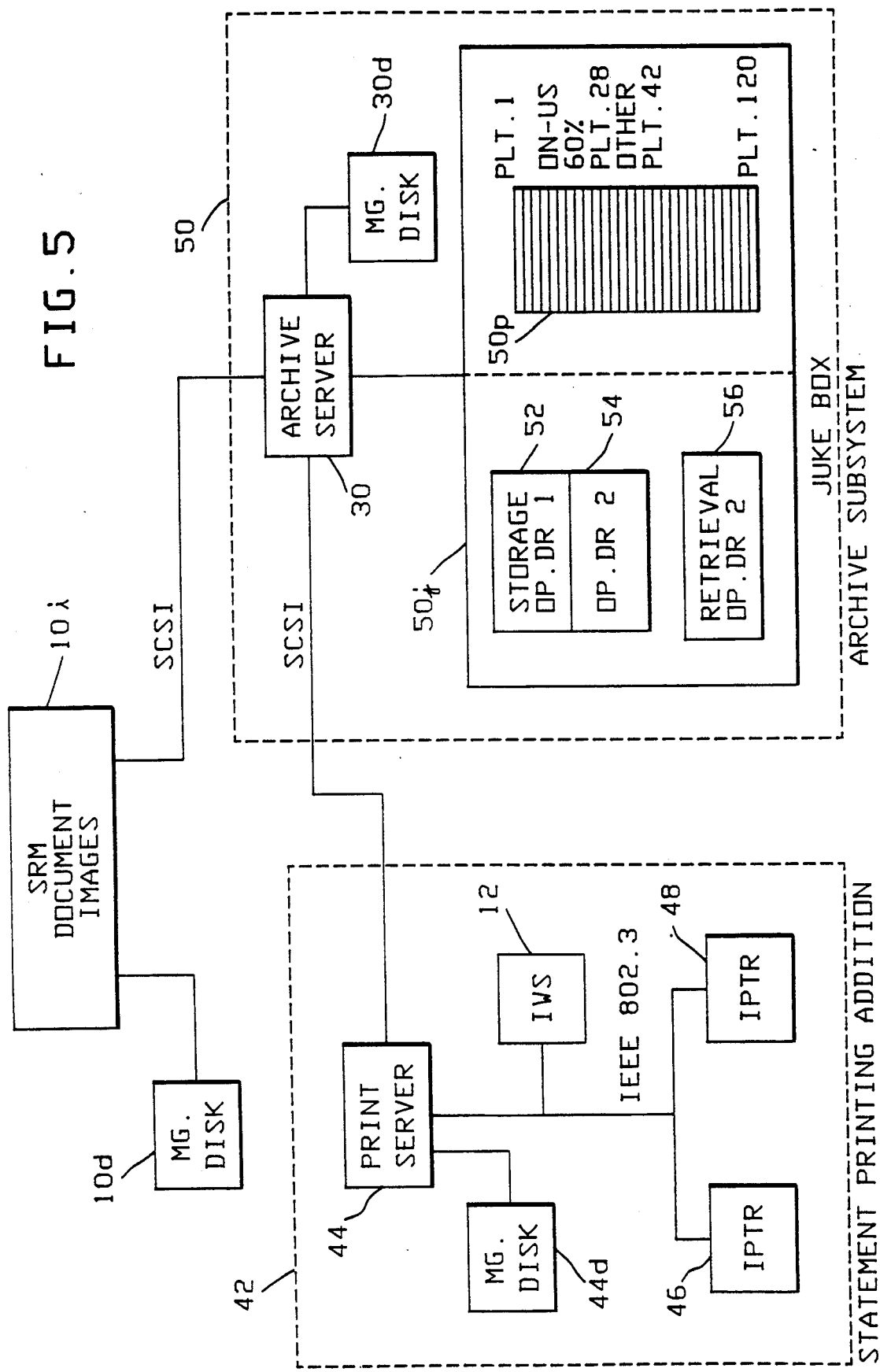

FIG. 6A

INITIAL PRINT FILE EXTRACTED FROM IPS DATABASE (DAILY)

| DATE | A/C # | CHECK # | AMOUNT $ |
|------|-------|---------|----------|
| 3/14 | 0001  | 6       | 20.00    |
| 3/14 | 0002  | 7       | 22.00    |
| ...  | ...   | ...     | ...      |
| 3/14 | 13.000| 3       | 182.00   |
| 3/15 | 18.000| 9       | 190.00   |
| 3/15 | 18.001| 6       | 650.00   |
| 3/15 | 0001  | 7       | 170.00   |
| ...  | ...   | ...     | ...      |
| 3/16 | 0001  | 9       | 35.00    |

| PLATTER # | RECORD # |
|-----------|----------|
| 1         | 1        |
| 1         | 2        |
|           |          |
| 2         | 2        |
| 2         | 200.000  |
| 2         | 200.001  |
| 3         | 2        |
|           |          |
| 4         | 7        |

CORRESPONDING PLATTER AND RECORD #

---

| DATE | A/C # | CHECK # | AMOUNT $ |
|------|-------|---------|----------|
| 3/14 | 0001  | 6       | 20.00    |
| 3/14 | 0002  | 7       | 22.00    |
| ...  | ...   | ...     | ...      |
| 3/14 | 13.000| 3       | 182.00   |
| 3/15 | 18.000| 9       | 190.00   |
| 3/15 | 18.001| 6       | 650.00   |
| 3/15 | 0001  | 7       | 170.00   |
| ...  | ...   | ...     | ...      |
| 3/16 | 0001  | 9       | 35.00    |

| PLATTER # | RECORD # |
|-----------|----------|
| 1         | 1        |
| 1         | 2        |
|           |          |
| 2         | 2        |
| 2         | 200.000  |
| 2         | 200.001  |
| 3         | 2        |
|           |          |
| 4         | 7        |

ABOVE TWO FILES ARE MERGED TO CREATE ONE MASTER PRINT FILE. TOP TWO FILES ARE CREATED DAILY AND MERGED TO THE MASTER PRINT INDEX FILE AND MAINTAINED THROUGHOUT THE MONTHLY STATEMENT CYCLE. THIS FILE CAN BE DELETED AFTER ONE STATEMENT CYCLE AND NEW ONE MAY BE CREATED.

FIG. 6D

| ACCOUNT # | CHECK # | OLD RECORD # | NEW RECORD # |
|---|---|---|---|
| 1 | 1 | 1 | 1 |
| 1 | 2 | 100.000 | 2 |
| 1 | 1 | 10.000 | 3 |
| 2 | 2 | 0079 | 4 |
| 2 | 1 | 1 | |
| 1 | 20 | 300.000 | 5 |
| 2 | | | |

(NEW RECORD NUMBERS FOR OLD RECORD NUMBERS)

FIG. 6F

| A/C-1 CK-1 REC-1 | A/C-2 CK-2 REC-2 | A/C-2 CK-1 REC-3 |
|---|---|---|
| A/C-1 CK-2 REC-4 | A/C-2 CK-20 REC-5 | |

(MAGNETIC BUFFER MAPPING AS IN FIG.6C)

FIG. 6E

| A/C-1 CK-1 REC-1 | BLANK DISK SPACE |
|---|---|
| BLANK DISK SPACE | A/C-2 CK-1 REC-079 |
| A/C-2 CK-2 REC-2 | BLANK DISK SPACE |
| BLANK DISK SPACE | A/C-1 CK-2 REC-100.000 |
| BLANK DISK SPACE | BLANK DISK SPACE |
| BLANK DISK SPACE | A/C-2 CK-20 REC-300.000 |

(NEW MAGNETIC BUFFER MAPPING WITH NEW RECORD NUMBER)

FIG. 7

MAGNETIC STORAGE OF PRINT SERVER 44d

| | | | |
|---|---|---|---|
| A/C-1 CK-5 | A/C-18000 CK-1 | A/C-1 CK-3 | LOG PL-1 |
| A/C-1 CK-7 | A/C-1 CK-18 | | |
| A/C-1 CK-9 | A/C-13000 CK-5 | | LOG PL-5 |
| A/C-5 CK-19 | A/C-1 CK-9 | | |
| A/C-1 CK-7 | A/C-1 CK-12 | A/C-9000 CK-2 | LOG PL-10 |
| A/C-1 CK-11 | A/C-1 CK-17 | A/C-1 CK-16 | LOG PL-15 |
| A/C-1 CK-13 | A/C-19 CK-20 | A/C-1 CK-14 | LOG PL-20 |
| A/C-15000 CK-17 | A/C-18000 CK-19 | | LOG PL-30 |
| | | | LOG PL-42 |

JUKE BOX — PL-1 ... 50 ... PL-42 PHYSICAL PLATTERS

LOGICAL PLATTER MAPPING OF CHECK IMAGES FOR THE CYCLE

| ACCOUNT # | CHECK # | PLATTER # | RECORD # | AMOUNT | DATE (CAPTURE) |
|---|---|---|---|---|---|
| 1 | 1 | 1 | 1 | 100.000 | |
| 1 | 2 | 10 | ... | ... | |
| ... | ... | ... | ... | ... | |
| 2 | 1 | 1 | 10.000 | | |
| 2 | 2 | 2 | 0079 | ... | |
| ... | ... | ... | ... | ... | |
| 2 | 20 | 42 | 300.000 | | |

SORTED INDEX FILE FOR ONLY ONE PRINT CYCLE. THIS CAN BE CREATED FROM MASTER PRINT FILE FOR EVERY PRINT CYCLE.

IMAGE STATEMENT PRINTING SYSTEM WITH DOCUMENT STORAGE/RETRIEVAL USING OPTICAL MEDIA

FIELD OF THE INVENTION

This disclosure involves systems for storage and retrieval of documents, such as checks and financial information. An efficient sorting algorithm for the retrieval of image data is provided whereby large volumes of statements or financial data can be retrieved and printed out in large volumes in a short space of time.

CROSS-REFERENCES TO RELATED APPLICATIONS

This application is related to the following applications filed in the United States Patent Office and included herein by reference:

U.S. Pat. No. 5,170,466 for "Storage and Retrieval System for Document Image and Document Data Items".

This application is also related to a co-pending application entitled "Document Image Archival Processing and Printing System", filed on the same date as this application which issued as U.S. Pat. No. 5,187,750.

BACKGROUND OF THE INVENTION

With the present day proliferation of exceedingly high-volume databases, there is an increased desire toward automation of routine functions in the retrieval and handling of large volumes of data. This is especially the case in the work of financial institutions whereby thousands of documents such as checks, deposit slips, remittance information forms, etc. must be checked, sorted, corrected, totalled and returned to other financial institutions and where monthly statements must be prepared for individual checking accounts of thousands of customers.

While previously many financial and banking institutions were forced to maintain large staffs of people to manually handle the tedious document processing procedures, it was found efficient to provide means whereby large groups of specific amounts of data could be retrieved and printed, such as that required by a banking institutions, which found it necessary to provide hundreds of thousands of bank statements each month to its customer base.

The patent applications hereinbefore listed as relating to storage and retrieval systems for document images and document data items are one example where highly automated systems were provided in order to record documents and turn them into electronic images which could be stored on magnetic disk media and retrieved at a very high rate of speed. Further, these patent applications indicated how work stations could be integrated into such systems whereby system operators could quickly and easily retrieve image data regarding the documents which were placed into the system.

It should be understood that these hereinbefore listed patent applications are to be considered as incorporated by reference in the supplying of vital information and background material to the subject matter of this instant application.

SUMMARY OF THE INVENTION

A highly sophisticated technological problem is presented when 50–100 trillion of bytes of information have been placed in archival storage, as is commonly done in a banking or financial institution, and the need arises to sort out specific portions of this data and to print them rapidly so as, for example, to be able to provide 300,000 to 400,000 individual account statements to customers during the period of a single, 30-day month. The system described herein can handle over a million account statements per month.

In regard to this problem, the following high-volume image statement storage, retrieval, and printing application system has been developed which will permit the high-volume storage of image data, from check documents, for example, which then can be sorted and retrieved and used to print thousands of data bytes into individual statements for individual customers.

Use is made of an indexing sorting algorithm which is applied to check or document images. The volume of image data (which is used for sorting during the function of "statement printing") is very high when it is considered that the approximate check image size is 30 kilobytes (KB) or that the average document size is 50 KB. The sorting algorithm is set to perform on the "indices" rather than a given "index-plus-image-data" item so that the images are not required to be sorted, but the "index file" is the only item to be sorted.

The electronic images are stored on optical disks for archival purposes and can then be transferred to magnetic disk-buffers which can hold a 30-day supply of information sufficient to print all the required customer account information during a 30-day period. Since the optical disk transfers are generally too slow for high-speed printing application, the images are transferred to the magnetic buffer/disks before the printing.

The described system provides improved features in both providing for long-term and short-term storage and retrieval of customer account data and document images. Massive amounts of data can quickly be retrieved for immediate display on a screen or for daily cycles of customer statement printout in massive numbers in relatively short, daily print cycles.

Massive data storage is provided in relatively small office-equipment-space and the high rate of retrieving and sorting data permits an unusually high rate of statement printout by the printing subsystem.

Additionally, rapid customer service for information, and/or replacement of document images or account statements, is effectuated in a short period of time via the rapid retrieval and printout system.

Since the stored document and image data is in binary digital form, it can also be retrieved and transferred by wire to a remote site or location for printout or for information display.

Thus the system provides solutions to the problems of long-term and short-term storage and for the long time-lags previously characteristic in sorting, retrieving and printing of massive numbers of documents.

BRIEF DESCRIPTION OF THE DRAWINGS

FIG. 1B is a block diagram showing the system arrangement for the statement printing application;

FIG. 3 is a schematic diagram showing the work flow arrangement for statement printing;

FIG. 4 is a block diagram showing the statement printing system making use of the optical drive and jukebox of optical platters;

FIG. 5 is a block diagram of a statement printing format whereby two optical drives are used for storage operations and one drive is used for retrieval operations;

FIG. 6A is a chart representation of the operations of the sort algorithm, and indicates how two files are merged to create one Master Print Index File (MPIF);

FIG. 6D is a drawing indicating the Final Print Index File with new record numbers;

FIG. 6E is a drawing showing how the Sorted Print Index File of FIG. 6C is burdened with many areas of "blank disk space";

FIG. 6F shows the Final Print Index File with new record numbers which eliminate the blank disk spaces in FIG. 6E.

FIG. 7 is a graph showing the sorted index file for one print cycle which can be generated from the MPIF (Master Print Index File) for every print cycle.

GENERAL OVERVIEW

Figure 1A:
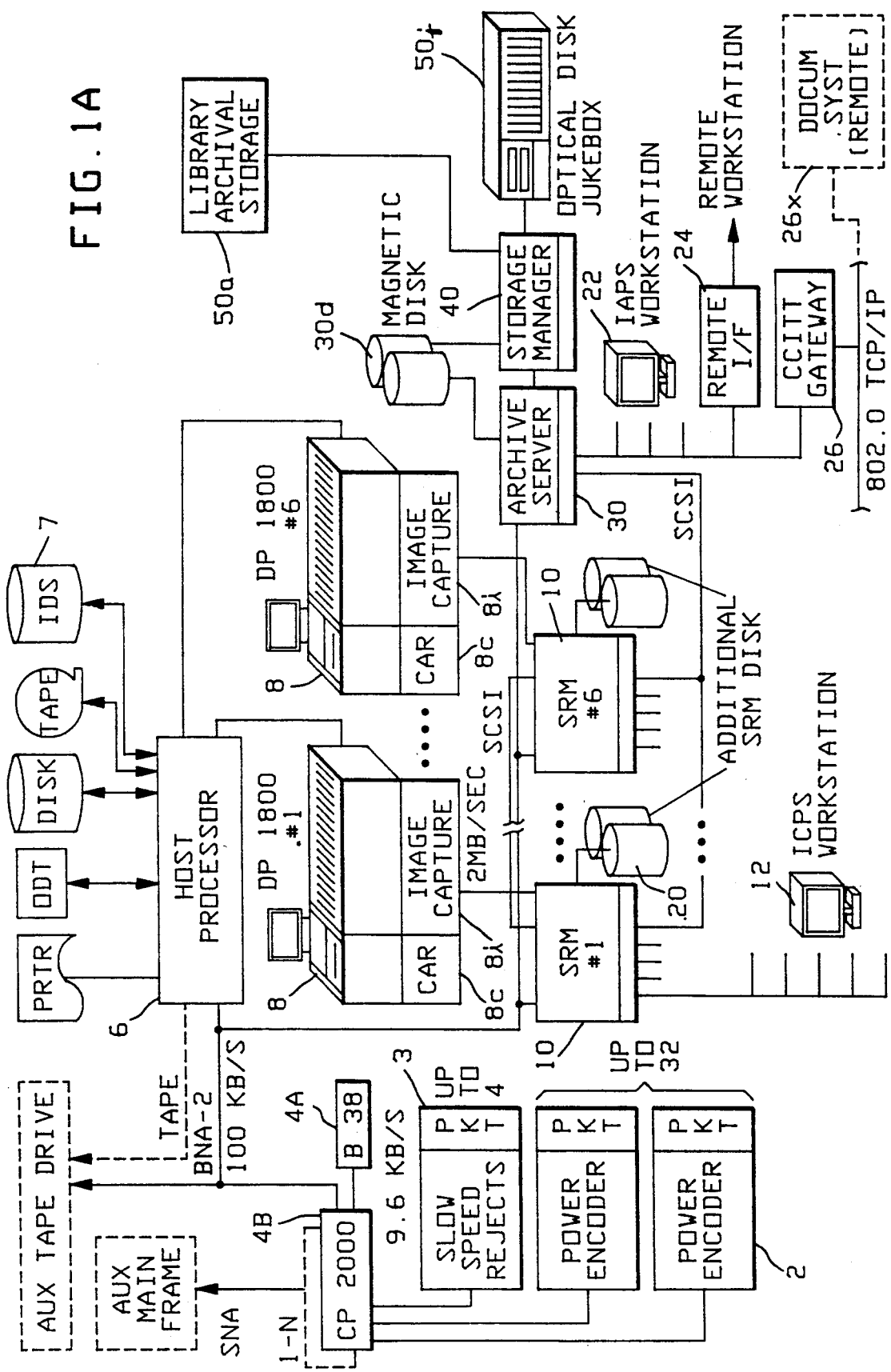
FIG. 1A is an overall block diagram of the image archival storage/retrieval and printing system.

The general system overview is seen in FIG. 1A. As seen in FIG. 1A, the central operating hub is the host processor 6 which may typically be a Unisys V Series 400 processor. Attached to the processor 6 are a number of peripherals such as a printer (PRTR), an operator display terminal (ODT), a magnetic storage disk (MSD), a tape storage unit, and an Item Data Storage unit 7 (IDS). The Item Data Storage Unit 7 (IDS) holds the MICR data (magnetic ink character recognition numbers) which are on each check document to identify the bank, the check number, the account number, the type of account (checking or savings, etc.) and the amount of the check. The MICR data may also include the date of entry into the processing system, called the "capture date". The IDS also holds software for selecting various items in the MICR data.

One data output bus from the host processor 6 is connected to a communications processor designated 4B. Attached to the communication processor are a number of other devices such as the Unisys B38 workstation, designed 4A. Also attached to the communication processor is a power encoder 2. The power encoders 2 are used for certain applications such as the reentry of rejected documents and for automatically encoding items passing through the document processor 8. The power encoder 2 will pass document data through the communications processor 4B over to the host processor 6. The power encoder 2 is used to print the magnetic ink character recognition information (MICR) or else print optical character read (OCR) characters onto the items. The document processor 8 is often designated as the Unisys DP 1800 which signifies that it can process up to 1,800 documents per minute.

As seen in FIG. 1A, the system may include up to six document processors 8 wherein each of the document processors has an image capture module $8_i$, and optionally a courtesy amount reader $8_c$ (CAR). The courtesy amount reader (CAR) $8_c$ functions to capture the dollar amount of the numerals written on the check area which is designated for writing a numeral amount.

The document processor 8 transforms checks and other documents into electronic images via the image capture module $8_i$ and then transfers it as digital data to the storage and retrieval modules 10 (SRM's). The SRM's 10 include magnetic disk media 20 for digital storage of the electronic image data.

A system operator can use a workstation such as workstation 12 to access data from the SRM 10.

For long-term storage purposes, data can be taken from the SRM 10 and processed through the archive server 30 and its magnetic disk $30_d$. Then it is transmitted to a storage manager 40 which places the image data into the unit $50_j$ which consists of optical disk jukeboxes. The module $50_j$ could be called a "jukebox" unit since it consists of a multiple number of optical platters, each of which can be accessed separately. The archive server 30 and the storage manager 40 have access to magnetic disks $30_d$ which provide additional storage capacity (temporary) to the archive server and storage manager. Also connected to the storage manager unit 40 of FIG. 1A is a Library Unit $50_a$ which can be used for archival purposes of long-term storage of image and information data. This Library Unit would preferably be an optical jukebox unit holding multiple banks of optical platters for storing digital data.

Connected to the archive server 30 is a workstation 22, a remote interface 24, and CCITT gateway 26 which can transfer image data to another documentation system.

The workstation 22 permits a system operator to retrieve archival data for viewing on a window screen.

The remote interface 24 permits data from the archive server to be transmitted to a remote workstation for display to a remote operator.

The CCITT gateway 26 provides a communication link to a transport control protocol/internet protocol (TCP/IP) to ensure that data packets are delivered to their destinations in the sequence in which they were transmitted.

Functionally, documents such as checks, are passed through the document processors 8. The image capture module $8_i$ makes an image of each check as it passes through the image capture module and optically transfers the corresponding digital data bits over to the storage/retrieval module SRM 10.

For longer term storage, the digital image data from the magnetic media disk $30_d$ is sent to the archive server 30 and then to the storage manager 40 for storage and placement on optical disks in the optical disk jukebox $50_j$. The optical disks are used for long-term storage to provide an archive function.

The host processor 6 can be programmed to select certain account numbers on certain days of the month and to cause the monthly account data to be retrieved from the optical disk jukebox $50_j$ for placement onto the disks $30_d$, which then can transfer to disk $44_d$ rapidly disgorge this information to a print subsystem 42 which can print each of the account statements in a rapid fashion.

The following requirements may be listed as a summary of the needs and functions for a statement-printing system.

For "ON-US" Statements: ("ON-US" statements are those belonging to the bank doing the processing.) There is a requirement that statements be printed monthly and the printing include "front" side of the image only. For each page of printed material, there will be total of eight images provided. The printer used will have a throughput in the range of 50-220 pages per minutes.

For printing of statements in the United States, an assumption will be made with respect to a mid-size bank which carries approximately 400,000 customer accounts, as well as commercial and reconciliation accounts. The subsequent calculations will be based on such a mid-size bank with the above number of accounts.

The check activity for the bank having an estimated number of "ON-US" items per day would look like the following:

There may be 400,000 customer accounts each having approximately 20 checks and covering a processing cycle period of 22 business days which could lead to involvement of 8 million checks per month.

The commercial-type account might be estimated to be 50,000 accounts, each account having 20 checks per monthly statement and having a processing cycle of four days which would sum up to approximately 1 million checks per month.

The reconciliation-type accounts could be estimated at 1,000 accounts which would have a processing cycle which would be daily (each day) and this would be estimated to involve 20 checks for each account which would lead to a total number of checks per month of 20,000.

Taking the total summation of checks involved in the above examples, the total number of checks would be 9,020,000 per month.

Now considering one calendar banking month as being 22 days and considering the optical storage requirements for 22 days, the following calculations must be considered.

For the customer-type account, these could be considered to be 25 percent business checks and 75 percent convenience checks. The front of each check would involve an image having 14 KB, while the back of the check would have an image taking 9 KB, leading to a total for the check size to be 23 KB. This would require that there be provided a total storage (ON-US) of 220,000 MB (megabytes).

The commercial accounts would be considered as 100 percent business checks which would require an optical image having 25 KB for the front of the check and 16 KB for the back of the check, giving a total of 41 KB for total image information for one check. This would require a total optical storage requirement of 410,000 MB (41,000 bytes × 1,000,000 checks).

In regard to reconciliation-type accounts which have to be retrieved and balanced daily, it may be considered that these would be 100 percent business type checks which, again, would require an optical image size of 25 KB for the front and 16 KB for the back, a total information storage of 41 KB per check. This would require a total optical storage of 820 MB (1,000 accounts by 20 checks each × 41 MB).

TEN-YEAR STORAGE REQUIREMENT FOR CUSTOMER, COMMERCIAL, AND RECONCILIATION ACCOUNTS: The following summary will indicate a gradation of storage requirements over a period of time for archival purposes. Thus, the 9.02 million checks (ON-US) for a monthly banking period of 22 days would require a total storage of 436.36 GB (gigabytes or 1 billion bytes) of which 60 percent of this figure would come to 261.82 GB assuming that 60 percent of the total checks processed are ON-US items, and 40 percent of the total checks processed are "transit" items which are merely passing through the bank on to final destinations at another bank than the local bank.

The storage requirement for one year would involve 108.24 million checks for a total storage requirement of 5,236.40 GB for all checks and 3,141.84 GB for storing ON-US The storage requirement for ten years would involve 1,082.40 million checks (ON-US) requiring a total storage of 52,364 GB for all checks and a 60 percent figure of 31,418.40 GB for storing ON-US checks.

Thus, the total storage requirement for ten years would come to 52,364 GB which is equivalent to 52.364 terabytes, or to put it another way, this is equivalent 52,364 billion bytes. A terabyte is 1,000,000,000,000 or 1 trillion bytes.

In the following system, it will be seen that the total print window required for a complete statement printing cycle involves time required to (a) retrieve, (b) sort, and (c) print images. It is assumed that the daily reconciliation account work statement printing is done after all of the check images are transferred to the jukebox (archival storage 50j). A total of 3 platters may be accessed to accomplish the task of account reconciliation statements on a daily basis.

In the present retrieval and printing system for monthly statement printing, there has been eliminated a very time-consuming step which was characteristic of the prior art. In the prior art, very usually, the check "image data" were sorted. In the present system, the check images are never sorted. It is only the "index file" which carries reference information (about the check images) which is sorted.

Previous sorting methods such as that developed in U.S. Pat. No. 4,611,280, involve sorting algorithms or "variable record" lengths, and which used more than one variable length sort key. In the present situation, the sorting methods involve using data to be sorted which is of a fixed length in the sort field. Additionally, the present system involves fixed record sizes since it is only the index file that is sorted, and never the actual check image data records.

For example, the average record sizes for a check image may be in the range of 30 KB to 50 KB. This is a relatively large size record which is possibly 50 times greater than the traditional data processing record sizes which may be from 128 to 1,000 bytes (1 KB).

If it were necessary to access and sort these various lengths of check image data, a very time-consuming set of steps and functions would be involved. Thus, the present system operates only on fixed-length index file record sizes which can be sorted very quickly.

This is accomplished by transferring images (digital image data) from the archival optical jukeboxes to a magnetic media which holds data covering a period of 30 days only (to cover the 22-day-banking-cycle monthly period). The actual check images are related to an index file, and it is only necessary to sort the index file and then retrieve the check image data in such a manner that many periods of sorting time are saved and reduced in an efficient manner.

DESCRIPTION OF PREFERRED EMBODIMENT

The basic architecture for the document storage and retrieval process system is shown in FIG. 1B. Here the host processor 6 is shown connected to the communications processor 4B and also to each of three document processors 8$_a$, 8$_b$, and 8$_c$. These may preferably be units such as Unisys DP1800 Document Processors which can process 1,800 documents per minute by converting a paper document to optical digital image data for transmittal to a storage means.

Each of the document processors are connected to respective SRM's 10$_a$, 10$_b$, and 10$_c$. The outputs of the SRM's 10 are connected to the archive server 30, which is part of the archive subsystem 50. Subsystem 50 is composed of the archive server 30, which is connected to the optical disk jukebox 50$_j$. The archive server 30 is also connected by a standard protocol communication line (IEEE 802.3) to a remote interface 24 which can convey the archival data to a remote printing station, 45.

As seen in FIG. 1B, the printing subsystem 42 is composed of a print server 44 which connects by means of a small computer system interface (SCSI) to the archive server 30. The output of the print server 44 is connected to printers 46 and 48 which in this particular case, are shown as having 220 pages per minute printing capabilities.

Figure 1C:
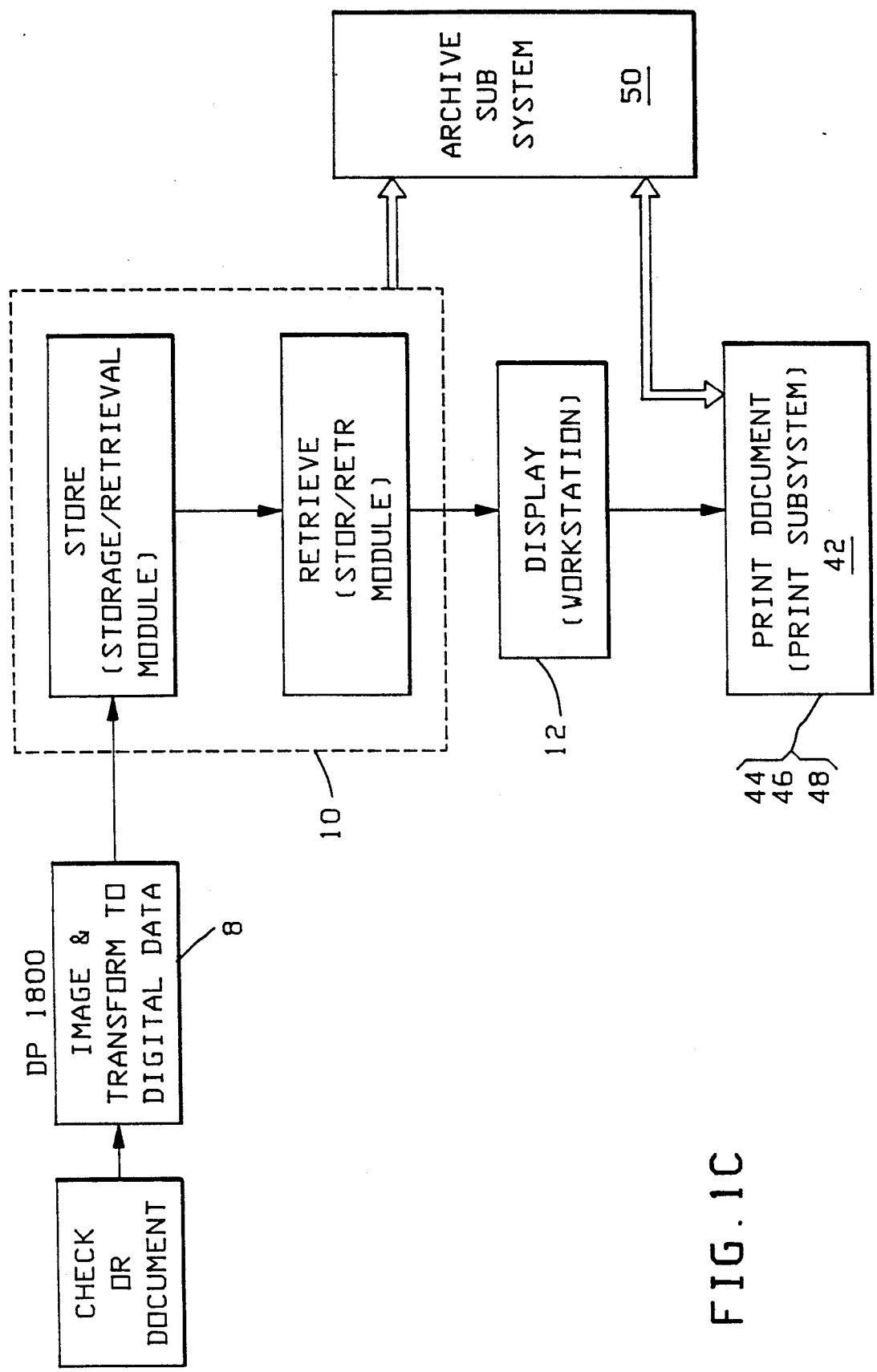
FIG. 1C shows a block diagram of the basic platform with an added archival subsystem.

FIG. 1C shows the "Basic Platform" for document processing with the additive subsystem 50 designated "Archive Subsystem".

A check or document C$_d$ is processed through a document processor 8 where an image is made of the document in terms of digital data (optical) which is transmitted to a Storage/Retrieval Module (SRM) where it is converted to magnetic digital media storage.

A workstation 12 may call up and retrieve the stored magnetic data for visual display if desired. Normally, the magnetic digital data will be conveyed to the Print Subsystem 42 for printing.

In order to provide for long-term (40-year) storage, the Archive Subsystem 50 can receive the digital magnetic data from the SRM 10 and convert it to optical digital data for storage on optical platters in a jukebox 50$_j$ since the SRM 10 is used only for short-term data storage.

The concept for this system has been considered in terms of three alternatives. The first alternative is the "worst-case configuration" of FIG. 2. Here, the document images are stored in the jukebox 50$_j$ in the captured order. It then takes between 18 to 22 total clock hours to process and print statements for one complete cycle of a mid-size bank with 400,000 customer accounts. This assumes that the number of statements is approximately the same for each monthly print cycle. However, using the system of FIG. 1B, the "printout window" can be reduced to between 9.25-10.25 hours by the use of four printers instead of the two printers 46 and 48 of FIG. 1B. This assumes that each customer monthly printout statement report is approximately three to four pages and includes the text for printing.

The second alternative configuration (Alternative No. 2) would involve a slightly different hardware configuration. In Alternative No. 2 shown in FIG. 4, a combination of an optical drive device (such as made by LMSI Company, whose address is Laser Magnetic Storage International Company, 2914 East Katella, Suite 212, Orange, Cal. 92667), and the jukebox 50$_j$ can be used for performance improvements. The LMSI optical storage units are designed for short-term storage. In the instant configuration, they are used for 30 calendar days (that is to say, 22 business-day statement cycles) which is enough to print all of the statements required. It would require about 9-10 hours with four functioning printers and providing for 3-4 pages plus text for each customer statement report.

The third alternative configuration of FIG. 5 involves the concept of "ON-US" items which are separated from other "transit" items. The "ON-US" items are accounts which belong to the bank which is operating the storage and retrieval system. These should be distinguished from data and documents which involve checks or information which belong to "other outside" banks, such as, checks which are passing through the local bank on their way to final destinations at other-owned remote banks. The locally owned "ON-US" items are stored within a fixed range of media in the jukebox 50$_j$ of FIG. 1B. This enables the system to access a minimum of number of platters (42 platters out of 120 total) for statement printing, and in so doing, increases the print speed performance. In this case, the time factor involved would be 9-10 hours with four functioning printers printing reports of 3-4 pages each, including the text.

Thus, there is approximately one-hour's savings in time between the "worst-case" design and the alternative third design configuration. The saving in time in the third design configuration is due to the handling of a comparatively small number of platters (42 out of 120) and wherein an efficient indexing sorting algorithm is used in each of the three configurations. All document images are accessed using "pointers" (FIG. 6C), and the use of the sorting algorithm involved permits the rapid sort and retrieval and printout of the high volume of customer accounts in a relatively short space of time. Thus, while the normal time cycle to print one daily cycle of about 18,000 accounts of the base 400,000 customer accounts would normally take 18 to 22 clock hours, it can been seen that the present system will reduce this to somewhat below ten hours which is approximately a 50 percent reduction in the time previously required.

FIRST WORST CASE CONFIGURATION: In this situation, of FIG. 2 all the check images are written to the optical storage jukebox 50$_j$ in the "capture" order. That is to say, the sequence in which the checks are inserted into the document encoder and captured by the image capture module 8$_i$ is the sequence order in which the checks are placed in the optical storage jukebox 50$_j$. Assumptions, for analysis purposes, are made in order to analytically view the operation of the system. Thus, consumer accounts are divided into N cycles to conform to the N banking days of a month. "N" is typically in the range of 20-25 days. An N value of 22 will be used for the calculations in the examples. It is also assumed that the bank has 400,000 customer accounts and that the cycles are divided as shown in Table I.

TABLE I

| CYCLE NO. | ACCOUNT RANGE | CYCLE DATE | STATEMENT PRINT DATE | |
|---|---|---|---|---|
| 1 | 1-18,000 | 1/1-2/1 | 2/1 | |
| 2 | 18,001-36,000 | 1/2-2/2 | 2/2 | Cycle #2 Account Numbers |
| 4 | 54,001-72,000 | 1/4-2/4 | 2/4 | 18,0001-36,000 |

TABLE I-continued

| CYCLE NO. | ACCOUNT RANGE | CYCLE DATE | STATEMENT PRINT DATE | |
|---|---|---|---|---|
| 5 | 72,0001–90,000 | 1/5–2/5 | 2/5 | (See Table IV) |
| . | . | . | | |
| . | . | . | | |
| . | . | . | | |
| 22 | 382,000–400,000 | 1/28–2/28 | 2/28 | |

Thus during the 22 cycles, each cycle involves the printout of 18,000 account statements on a given day of the month so that, for example, on February 1, the system prints out 18,0000 statements; on February 2, it prints out 18,000 statements, and so on, until February 28 it prints out the final group of 18,000 statements which cover the month-of-January transactions.

Under these assumptions, it would require on-line storage for 30 days in the jukebox $50_j$ in order to complete the statement printing for a single month for each and every one of the customer accounts involved. The jukebox $50_j$ has optical platters $50_p$ which are handled by storage drive 52 and retrieval drive 54.

Figure 2:
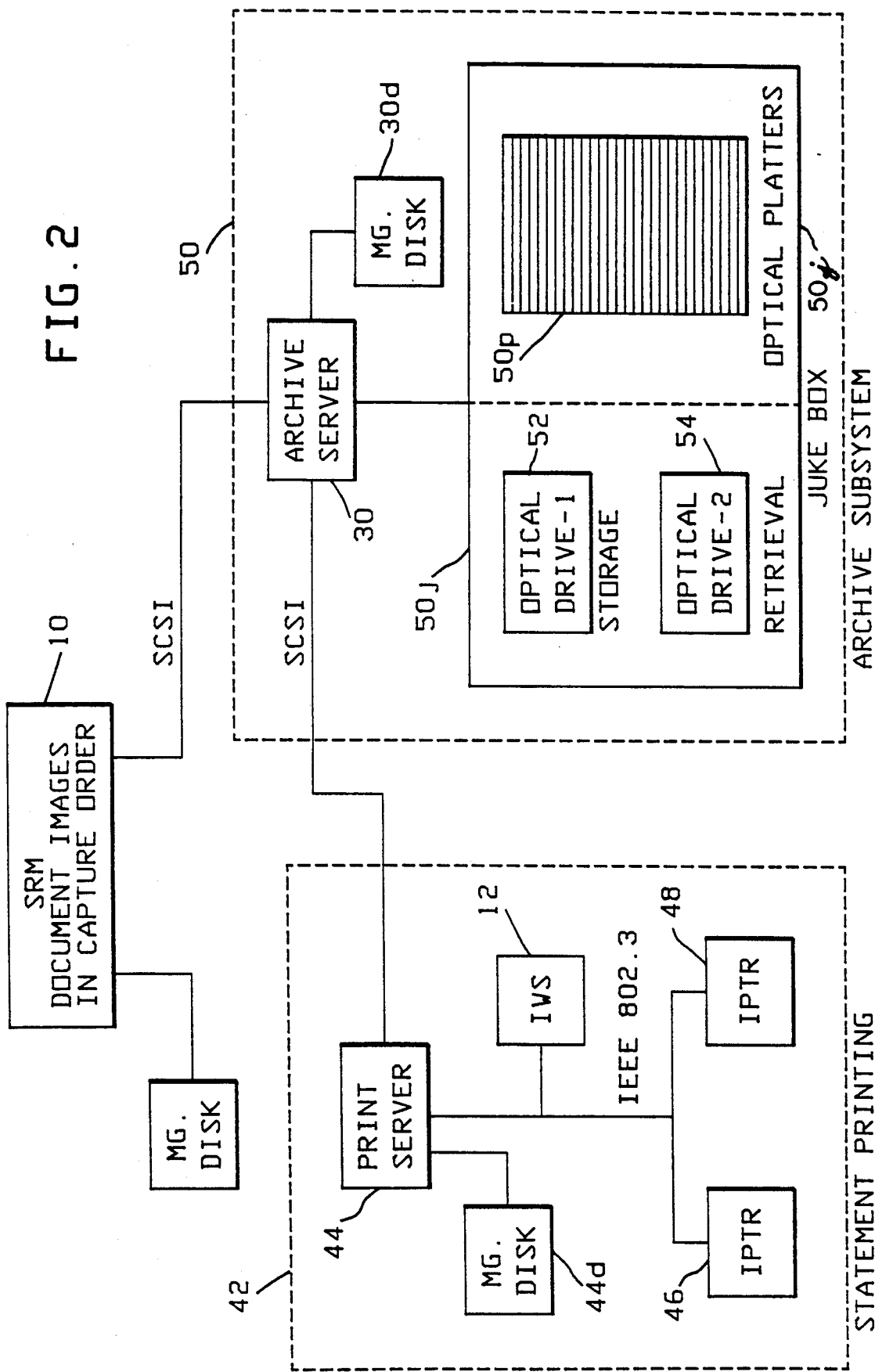
FIG. 2 is a block diagram of the system for statement printing involving the least efficient (worst case) format for statement printing.

It is assumed that as the checks are written in the captured order, the image data could be found in any one of the optical platters $50_p$ of FIG. 2.

It is further assumed that each optical platter of $50_p$ has a capacity of 10 gigabytes, that is to say, this is 1,000,000,000 bytes (1 billion) or $10^9$. In the worst-case configuration noted in FIG. 2, the image storage of the check document data are placed in the optical platters $50_p$ according to the sequence that they are captured, that is to say in the captured order.

For retrieval purposes, the images for any given account range (see Table I) are retrieved from the on-line storage (jukebox $50_j$) and then transferred to the print server 44 by means of the archive server 30.

Figure 6B:
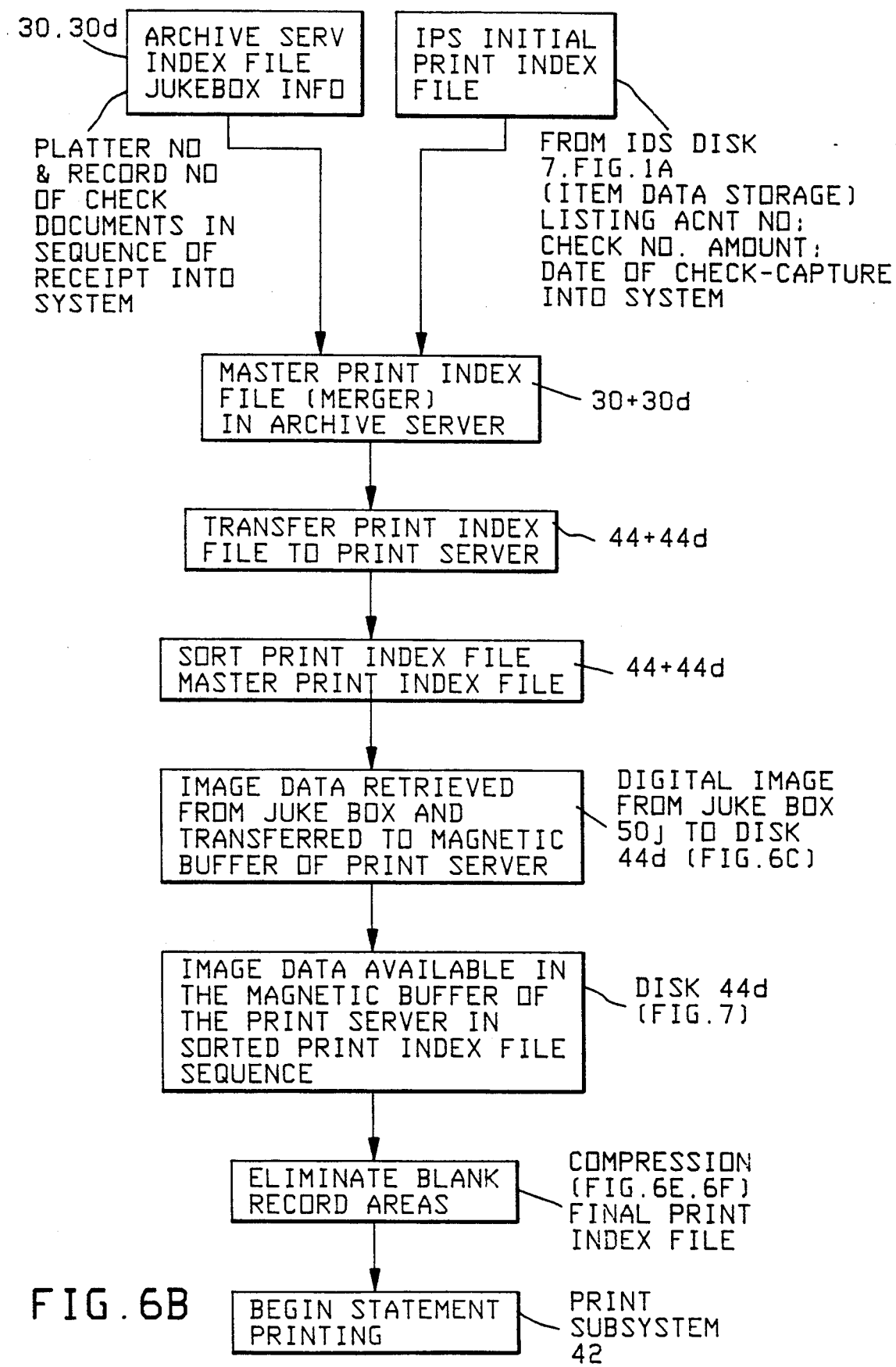
FIG. 6B is a flow chart showing the operational step sequence of merging information for the Master Print Index File and then sorting and retrieving image data for printing.

The work flow in this system can be better understood in reference to FIG. 3 and FIG. 6B.

RETRIEVAL ACTIVITY ANALYSIS:

The goal is to retrieve all the data for any particular cycle from the jukebox $50_j$ and transfer it to the print server 44. As an example, it may be helpful to look at cycle 1 (Table I) with the account range: 1 to 18,000, to observe the sequential functions.

STEP 1: Loading of platters and transferring image data in binary digits to the print server 44, which is done as follows:

(a1) Access the first platter ($50_p$ to platter, FIG. 2) of the month involved by loading it into the optical driver 54, FIG. 2;

(b1) Transfer all the data (by addressing the index file) for the range of account (1–18K) for that day to the magnetic disk storage ($30_d$ of FIG. 2) of the archive server 30;

(c1) Transfer all the data to the print server 44 and store it in the magnetic disk $44_d$ of FIG. 2;

(d1) Load the next platter ($50_p$) of the optical disk jukebox $50_j$, FIG. 2; scan the account range (1–18K), and transfer the check image binary data to the print server 44 via the archive server 30;

(e1) Continue the process until all of the first (1–18K) account range has been scanned and transferred to print server 44.

At this stage, it is seen that all the data for the account range (1–18,000) for cycle 1 is in the magnetic storage $44_d$ of the print server 44. The amount of data stored in the print server 44 for "customer accounts only" would be as follows:

(18,000 accounts × 17 KB (average image size, front only) × 20 (number of checks) = 6.12 gigabytes (customer)

Then, for 12,500 "commercial accounts", each having a 25-KB image size:

(12,500 × 25KB (average image size front only) × 20 (number of checks) = 6.25 gigabytes (commercial)

The first step as illustrated in FIGS. 2 and 3, involved the loading of the optical platters and the transfer of data to the print server 44.

STEP 2: The second step, or step 2, involves the sorting of data and the printing of statements. This is done by print server 44 as follows:

(a2) Sort all of the index file data (done via Archive Server 30) by the account number and by sorting the checks in sequential order. This is accomplished by the "sort algorithm" discussed hereinafter. At this juncture, it is necessary to copy the "Master Print Index file" from the archival server 30 into the print server 44;

(b2) After the customer account numbers are sorted, they will require decompression by the Print Server 44 before they can be printed in full copy, since the image capture unit $8_i$ originally compressed the image data;

(c2) Then the task of printing is distributed by the software in Print Server 44 to the available printers involved.

The total estimated magnetic storage in disk $44_d$ that might be required for the print server 44 to print customer, commercial, and reconciliation accounts on the very same day are indicated as follows in Table II:

TABLE II

| Type of Account | Storage Required |
|---|---|
| Customer | 6.12 GB |
| Commercial | 6.25 GB |
| Reconciliation | 0.50 GB |
| Print Index File | 0.80 GB |

The Print Index File requires 100 bytes for each "index record" for storage for a period of 30 days. The total maximum magnetic disk storage required may be estimated at 6.25 GB + 0.80 GB + overhead = 7.05 GB. Added overhead would be required for the Print Server 44.

In regard to doing a performance analysis wherein the "front" and the "back" of a document are in one file, the following assumptions are made:

1. The "ON-US" statement printing is done during the night.
2. The window time for printing is 10 to 12 hours.
3. Printing is done in off-business hours and in a batch mode.
4. The images of the "front" side of the check are printed in the actual statements.
5. The printer speed is set at 90 pages per minute (PPM).
6. The time required to change platters via optical retrieval drive 54 is 6 seconds.

7. The capacity of each platter $50_p$ is 10 gigabytes (GB).
8. The "front" and the "back" images are stored together in the same files in the captured order. The front images are only retrieved for printing purposes while the back images are skipped.

Now, using as an example, a CYGNET 1800 Jukebox with a Hitachi drive, the following projections can be made. The CYGNET 1800 Jukebox is manufactured by CYGNET SYSTEMS, INC. of Sunnyvale, Cal., whose address is 601 West California Avenue, Sunnyvale, Cal. 94086.

The Table III hereinbelow indicates the various factors involved in the first (worst case) configuration regarding the CYGNET 1800 Jukebox and the forthcoming higher capacity jukebox drive.

TABLE III

| Specifications | CYGNET 1800 | FORTHCOMING CYGNET DRIVE |
| --- | --- | --- |
| Media capacity | 2.6 GB/Platter | 10 GB/Platter |
| Average Seek Time | 200 ms | 50 ms |
| Average Latency | 50 ms | 25 ms |
| Transfer Rate | 440 KB/sec | 800 KB/sec |
| Seat & Spinup Time | 4.5 sec | 1.5 sec |
| Spindown Time | 3.5 sec | 1.5 sec |

Using the above-mentioned assumptions, an analysis can be made which would indicate that the total storage required for 22 days (a banking month) would come to 436.36 GB. The total "ON-US" items storage for one month would be 60 percent of 436.36 GB and this would come to 261.81 GB. Thus, the total number of optical platters required for "two months storage" would be approximately 46, which is to say that using a 0.95 effectiveness factor times required storage of 436.36 GB, times 10 would equal 45.89 or approximately 46 optical platters needed for two months. Thus using platters each holding 10 GB, then 46 platters would provide a total storage of 460 GB which could handle the required 436.36 GB for the 22-day bank month.

It is estimated that the effective usage for each platter is at the level of 95 percent. The system operates such that it would always be accessing 28 platters for every given cycle of monthly statement printing.

It has been estimated that the average document (customer account) image size (front and back) comes to 27.5 KB.

Likewise, the estimate for the average image size for statement printing of the "front" image (customer account) only would be 17 KB. The total number of images stored on one platter would be 345,454, while the total number of images stored on "one side only" of a platter would be 172,727.

The total number of "ON-US" images on one platter would be estimated at 207,272, while the "average" ON-US images/cycle/platter would come to 9,421. Thus the average ON-US images/cycle/one-side of platter would come to 4,710.

The ratio of the total number of images/images-retrieved per platter would come to 36.6 and this means that approximately one in every 37 images will be retrieved.

Now, in order to "retrieve" one image (on an average basis), it is necessary to move 37 images, to wait for latency, and to read the desired image from the optical platter. This requires approximately 10 milliseconds, +25 milliseconds+(17×1000/800) milliseconds.

To retrieve images from one side of a platter (4,710 images), it is necessary to drive the platter, seat the platter and use spin-up time+spin-down time+read time which comes to an estimate of 1.5 seconds+1.5 seconds+0.05625×4710 results in a time of 0.0568 seconds per image on an average basis. Thus, it would take 56.8 milliseconds per image to retrieve an image from one side of a platter.

Thus, in order to print a daily cycle of 18,000 customer account statements, the print time required would be 18,000 (customer accounts)×20 (checks per account)×0.0568 seconds (image retrieval) which comes to 20,448 seconds or 5.6 hours.

Likewise, for "commercial accounts", the estimated time to retrieve one image would come to 31.25 milliseconds and to retrieve images from one side of the platter (4710 images) would take 315 seconds and this would involve the average time value of 66.88 milliseconds per image retrieved. The total time required to retrieve 12,500 images covering a monthly accounting period of the prior 22 days would involve 16,720 l seconds, or 4.6 hours.

Sometimes it is necessary to retrieve image data in order to reconcile certain discrepancies in account data. For this "reconciliation" operation, the following analysis would indicate that to receive images from one side of the platter would take 25.27 seconds. Assumption is made that 1,000 image items (covering the prior month) located on three sides of platters would be involved. Thus, 1,000/3 equals 333 images on one platter side and the total number of platters/cycle would be equal to 28/22 which equals 1.27 thus involve the use of 3 sides of the platters. Thus, 1.5+1.5+0.06688×333 equals 25.27 seconds. Then 25.27 seconds divided by 333 images equals 0.0758 seconds retrieval time per image.

Thus, the total time required to "retrieve" (on a daily basis) 1,000 reconciliation accounts covering the prior month period, would come to 1,000×20×0.0758 which comes to 1,516 seconds and which is equal to 0.421 hours, or approximately one-half hour.

It is assumed that there is no additional time required to transfer all image data from the archive server 30 over to the print server 44 as the images are "transferred" to the print server 44 in the 5.6 hour "retrieval window" which is also used for the archive server.

In this situation for the "reconciliation" accounts, the time to "sort" 18,000 accounts covering the prior month, could occupy from a few minutes to approximately 0.5 hour.

PRINT PERFORMANCE ANALYSIS: After retrieval, the system then functions to execute the printout cycle. Here the following assumptions are made:
P1: Compressed check-sized images will be printed.
P2: Each printout page can hold up to eight images.
P3: Printing speed will operate at a speed of 90 PPM.
P4: The printer is assumed to operate on an 80 percent duty cycle.

It will be noted from the previous analysis, the average "retrieval time" per image for customer checks would be 56.8 milliseconds (ms). Thus the "retrieval time" for a total of 18,000 accounts, each having 20 checks within them, would come to 18×20×0.0568 which comes to 5.6 hours.

SITUATION 1: FOR PRINT OUTS AVERAGING THREE PAGES PER ACCOUNT AND INCLUDING TEXTS:

The following analysis would occur under this first situation where the total number of pages required to be printed comes to 54,000 pages. Since there are 18,000 accounts handled per daily cycle multiplied by three pages for each account, this comes to 54,000 pages. The time required to print 54,000 pages in only "one" printer would come to 12.5 hours, that is to say, 54 divided by (90×60×0.8 duty cycle) equals 12.5 hours.

The time required to print 54,000 pages with two printers would be 6.25 hours, and the time required to print 54,000 pages with three pages would come to 4.16 hours; while using four printers, this would come to 3.125 hours.

Thus, by combining the 5.6 hours required for "retrieving" 18,000 accounts with 20 checks each, plus the 12.5 hours required to "print" 54,000 pages on one printer, plus the one-half hour (0.5) required to sort 18,000 accounts, this would lead to the total clock hours for the complete print cycle to be 18.6 hours. This would complete one cycle of Table I so that 18,000 statements would be completed on February first.

For commercial accounts where the total number of pages requiring printing would come to 37,500 pages, that is to say, 12,500 accounts by three pages each, the calculated total print cycle time would come to 8.6 hours which is 37,500 divided by (90×60×0.8).

Likewise, for reconciliation functions where the total number of pages would be 3,000 pages, or 1,000 items×3 pages, the total print cycle time would come to 41.6 minutes.

SITUATION CASE 2: TOTAL AVERAGE OF FOUR PAGES PRINTED PER ACCOUNT INCLUDING TEXT:

In this situation, the total number of pages to be printed in ON-US customer statements would be 72,000 pages and with the use of one printer, this would take 16.6 hours. With two printers, it would be 8.33 hours; and with 3 printers, this would involve 5.53 hours, while with four printers, this would only take 4.15 hours. Here the total clock hours required for printing (on one printer) would be 22.7 hours which would mean the use of 5.6 hours for retrieving 18,000 accounts with 20 checks each plus 16.6 hours which is the time required to print 72,000 pages on one printer, plus one-half hour (0.5) which is the time to sort 18,000 accounts.

Likewise, using four pages of printing in commercial account statements, then for "commercial" accounts, the total number of pages required would be 50,000 pages which is 12,500×4 and the total print time would come to 11.57 hours.

Likewise for the reconciliation account function, then for the retrieval of 1,000 documents printed on 4 pages, this would come to 4,000 pages and the total print time would be 55.55 minutes.

Referring to FIG. 3, it will be seen that the check image archives are kept in the optical jukebox $50_j$ and the check images are stored in their capture order.

For one statement cycle (which covers 22-banking days), all of the check images are transferred to the print server 44 from the jukebox $50_j$ by means of the archive server 30.

The print server 44 gets a "list" of items to be printed from the host processor 6 which is also called the demand deposit account host or DDA host 6. The print server 44 retrieves check images for any statement cycle by scanning each of the platters $50_p$ in the optical jukebox $50_j$ for a 30-day period.

Then as seen in Block $44_s$ of FIG. 3, the sorting of check images is done according to their sequential "account number". Data is provided to print the statements required for the given printing cycle. Thus, in a typical, medium-size, modern bank, there can be provided a daily print cycle which retrieves and prints statements (of data from the past month of 22 banking days) on a daily basis to print some 18,000 account statements per day. Thus, over a 30-day month of 22 work days (bank work days), the system would be capable of printing out 396,000 account statements, or more.

Referring to FIG. 3, the "ICPS" is the Image Check Processing System providing software for various capabilities. The SRM images $10_i$ are available for reading and sorting. Likewise, the images in the SRM can be accessed for amount entry, for image data correction, and for balancing accounts.

The embodiment of the storage/retrieval and print out system of the present disclosure makes use of a sorting algorithm which is graphically represented in FIGS. 6A, 6B, 6C and 7.

The sort algorithm involves the following steps:

A. Creating an index file: This involves the following steps:
  (a) Create a "Print Index file" in disk $44_d$ to keep important information about the checks which have been processed. This is placed in the magnetic disk $44_d$ of FIG. 2. This is done by using the extraction method of the IPS, (image processing system) using the IDS disk 7. The index file in disk $44_d$ will have fields such as:
  Date (of capture of document into the system); Account Number; Check Number; Amount of Check. (The capture date is placed on the original document via magnetic ink encoding.)
  (b) Copy the modified Print Index file from disk $44_d$ to the Archive Server 30. Then add two more fields to that particular account file which will correlate the (i) platter number and (ii) record number. These can be received as a return value after writing the document data into the optical platter in the Jukebox $50_j$. This file is designated as the "Master Print Index File" (lower half FIG. 6A).
  (c) Build this file up to a capacity of 30 days by adding daily extractions to the original index file. In this system, it is contemplated to use only 30 days of indexing information (one monthly statement cycle) for statement printing. A brand-new print index file may be created after 30 days to be used for the next month's statement printing cycle. A total of 12 Master Print Index Files would be created for the yearly period.

Table IV, shown hereinbelow, indicates the appearance of the Master Print Index file from a complete cycle.

TABLE IV

| | Merged Master Print Index File | | | | |
|---|---|---|---|---|---|
| Capture Date | Platter Number | Account Number | Check Number | Record Number | Amount |
| 3/14 | 1 | 0001 | 5 | 1 | 20.00 |
| 3/14 | 1 | 0002 | 7 | 2 | 22.00 |
| . | . | . | . | . | . |
| . | . | . | . | . | . |
| 3/14 | 1 | 10,000 | 6 | 312,500 | 220.00 |
| 3/14 | 2 | 12,000 | 1 | 1 | 180.00 |
| 3/14 | 2 | 13,000 | 3 | 2 | 182.00 |
| . | . | . | . | . | . |
| . | . | . | . | . | . |
| 3/14 | 2 | 18,000 | 9 | 200,000 | 190.00 |
| 3/15 | 2 | 18,001 | 6 | 200,001 | 650.00 |

TABLE IV-continued

Merged Master Print Index File

| Capture Date | Platter Number | Account Number | Check Number | Record Number | Amount |
|---|---|---|---|---|---|
| 3/15 | 2 | 25,000 | 2 | 312,500 | 630.00 |
| 3/15 | 3 | 30,000 | 19 | 1 | 250.00 |
| 3/15 | 3 | 00,001 | 7 | 2 | 170.00 |
| 3/15 | 3 | 0001 | 7 | 9 | 25.00 |
| . | . | . | . | . | . |
| . | . | . | . | . | . |
| . | . | . | . | . | . |
| 3/15 | 3 | 32.000 | 18 | 312,500 | 176.00 |
| 3/15 | 4 | 33,000 | 17 | 1 | 177.00 |
| 3/15 | 4 | 00,001 | 19 | 2 | 195.00 |
| . | . | . | . | . | . |
| . | . | . | . | . | . |
| . | . | . | . | . | . |
| 3/16 | 4 | 0001 | 9 | 7 | 35.00 |

(d) Before any printing occurs, the complete index file with 30-days of information data will be transferred to the print server 44.

B. Sorting the index file: The next sequence of steps for "sorting" the index file (by account number) operates as follows:

(e) The index file is now sorted (via the software in server 44) by its "account number" before any digital image data will be transferred from the archive server 30 to the print server 44. After the index file has been sorted, the newly "sorted" Master Index File in server 44 will show the account information in the order as seen in Table V.

TABLE V

"SORTED" MASTER INDEX FILE

| Account Number | Check Number | Platter Number | Record Number |
|---|---|---|---|
| 1 | 1 | 1 | 10 |
| 1 | 2 | 2 | 20 |
| . | . | . | . |
| . | . | . | . |
| . | . | . | . |
| 1 | 20 | 27 | 300,000 |
| 2 | 1 | 3 | 100 |
| 2 | 2 | 7 | 40,000 |
| . | . | . | . |
| . | . | . | . |
| . | . | . | . |
| 2 | 19 | 24 | 200,000 |
| 2 | 20 | 26 | 250,000 |

The "Sorted Master Index File" on the print server 44 will follow the pattern as shown in Table V since it is transferred from the archive server 30 to the print server 44. The digital image data retrieved from the jukebox 50$_j$, according to the platter sequence, is transferred to the print server 44. The print server 44 (with its magnetic disk buffer 44$_d$) has a large file in the same platter sequence order just as is set up in the jukebox 50$_j$.

The large file 44$_d$ in the magnetic media of the print server 44 may take an appearance similar to the FIG. 7 upper left block. As seen in FIG. 7 in the upper left block, there are a series of account numbers such as A/C-1, CK 5, which indicates that this record is the fifth check in the Account 1. As another example, the 18,000th account is designated as A/C-18,000 and the nineteenth check is designated as CK-19. It will be noted that the various account numbers and check records are allocated to various "logical platters" so that the upper most group is stored in the logical platters 1 through 5, and similarly the lower groups of data are stored in logical platters 21-42 which corresponds to areas of the jukebox 50$_j$.

The lower portion of FIG. 7 shows the logical sequence of data according to the account number, the check number, the logical platter number, and the record number on the platter, which would then correlate with the amount of the check and the date of the check. The logical platter number in FIG. 7 is software information which relates the "physical" platter location to the check image data in magnetic disk 44$_d$. This is the "sorted index file" for only one print cycle of 18,000 customer accounts. By using the Master Print Index File, this sorted index file can be created for every single print cycle.

Figure 6C:
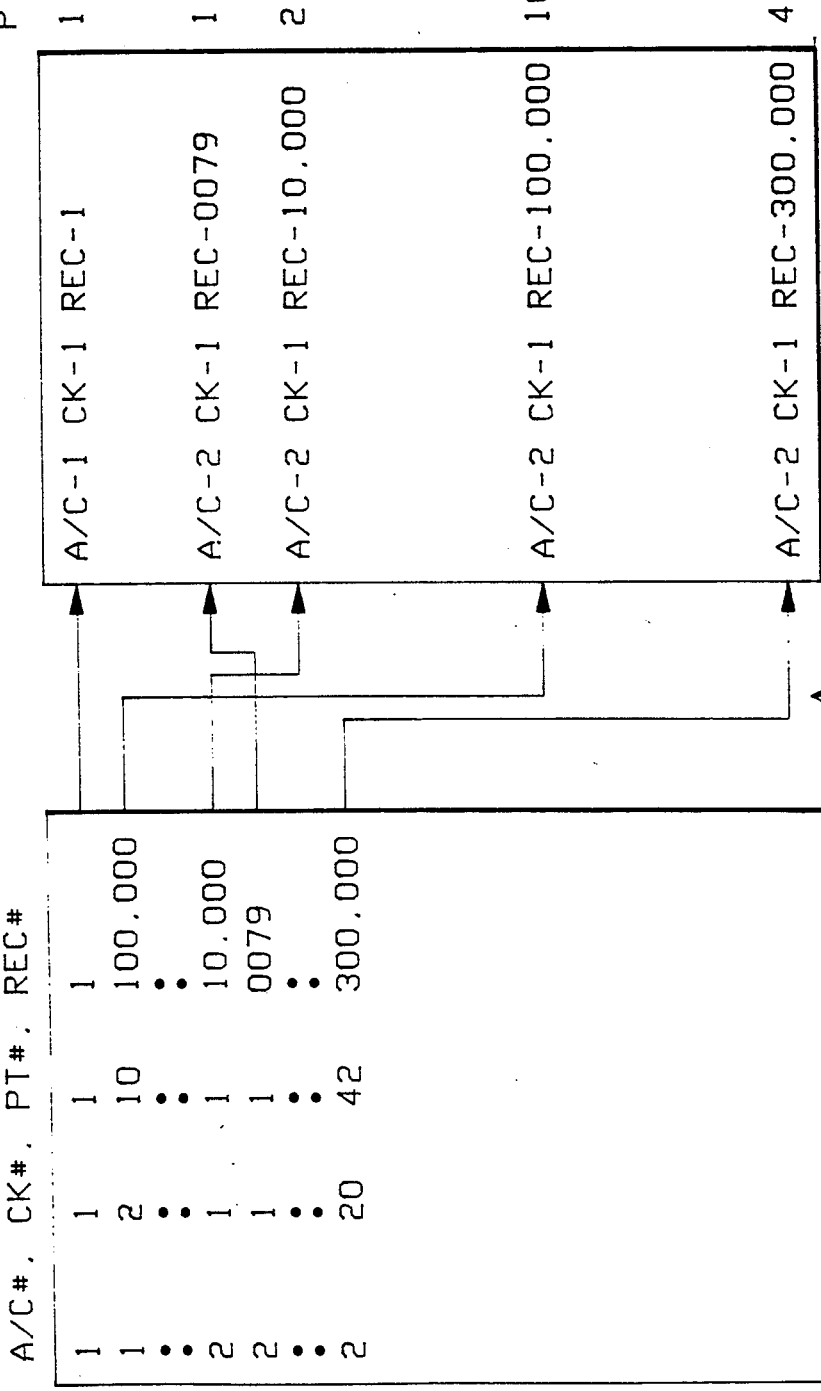
FIG. 6C is a schematic drawing indicating how the sorted index file accesses the proper image data for printing.

In FIG. 6C, the digital image data retrieved from the jukebox 50$_j$ by platter sequence is transferred to the print server 44. The magnetic disk buffer 44$_d$ of the print server 44 has a large file in the platter sequence order just as is done in the jukebox 50$_j$. When a record is searched by platter number, a "pointer" (via software in print server 44) will be moved to the appropriate area of the magnetic disk buffer file 44$_d$ in order to access that particular record.

The magnetic buffer 44$_d$ of print server 44 (FIG. 2) will contain check images (digital data) as indicated in FIG. 6C where the Sorted Print Index File shows the optical platter sequence for each account number.

However, due to the situation indicated in FIG. 6E, the Sorted Print Index File of FIG. 6C is burdened with many areas of "blank disk space".

In order to eliminate the time-consuming factors that this would entail, it is desirable to develop a Final Print Index File, such as indicated in FIG. 6F and FIG. 6D, which eliminates the blank disk space involved. This is accomplished by software in the Print Server 44 which operates to eliminate the blank areas (compression of data), and in so doing, replaces the "old record number" with a "new record number" as indicated in FIG. 6D.

There is no time penalty involved in this conversion since this compression of data from the Sorted Print Index File to the Final Print Index File is executed during the same time period as the retrieval of data is occurring from the optical juke box 50$_j$ to the magnetic disk 44$_d$ of the print server 44.

FIG. 6B indicates the step of the Compression Routine, done via software whereby blank record areas are eliminated so that the old record number in FIG. 6D is replaced with a "new" record number to form a "Final Print Index File" as shown below in Table V-A.

TABLE V-A

| Account Number | Check Number | Record Number |
|---|---|---|
| 1 | 1 | 1 |
| 1 | 2 | 4 |
| . | . | . |
| . | . | . |
| . | . | . |
| 2 | 1 | 3 |
| 2 | 2 | 2 |
| 2 | 20 | 5 |

The record numbers are new and reassigned for each check number and account number.

While the archive server disk 30$_d$ requires 0.80 GB to hold 30 days of data in the Master Print Index File, the print server disk 44$_d$ only requires 1.8 MB (Table IV) for holding "one day's worth" of Master Print Index File data, to enable one day's work of statement printing.

It may be noted that the platter numbers shown in FIG. 7 have already been mapped to the magnetic disk $44_d$ (FIG. 5) of the print server 44, which data is shown in FIG. 7 upper left block.

(f) At this stage, the digital image data for the given monthly print cycle is now available in the magnetic buffer $44_d$ of the print server 44.

(g) The next step is the reading of the "correct record" as printing gets started. The record access is directly accomplished by the use of pointers (FIG. 6C) operated through software in the print server 44.

The time to search one record will be approximately 15 milliseconds and the time to search all 18,000 accounts will be approximately 90 minutes. This can be seen as 18,000 accounts×20 checks (average). per account which gives us 360,000 records. Then the 360,000 records×15 milliseconds results in 5,400 seconds, or 90 minutes, for searching all 18,000 accounts.

Since the printing time, using four printers, requires approximately 8 to 10 hours, it is possible to search records for image data and print at the same time (except at the very beginning of the printing process). It is necessary to pre-process and keep the print file ready before it is possible to go ahead with the printing. After a few minutes of pre-processing, it is possible to continue to do both the pre-processing and printing at the same time, i.e., the searching and accessing of image data records can occur concurrently with printing operations.

The effective time required for sorting is considered to be approximately 30 minutes.

FIG. 6A, in the upper portion, shows the initial print index file which is extracted from the image processing system database in IDS 7. This is done on a daily basis wherein the corresponding platter and record number are correlated.

Thus, as seen in the upper part of FIG. 6A, a correlation link is started between a given capture date, the account number, the check number which goes with the account number, and the amount of money involved. This is correlated with a platter number such as Platters 1 and 2 for the "date" of 3/14 (FIG. 6A). Then additionally, each platter number is "associated" with a given "record number" to indicate the location of that digital image check data. This is done by software in archive server 30. For example, Platter 1 has the first record at position 1 and the second record at position 2 (FIG. 6A). Then Platter 2 has the image data for check 3 of account number 13,000, located on Platter 2 at record position 2.

The lower portion of FIG. 6A shows a duplicate of the information arranged similarly to the upper portion of FIG. 6A, but the two files are "merged" to Archive Server 30 (FIG. 6B) to create one Master Print Index File. The top two files of FIG. 6A are created daily and merged to create the Master Print Index File which is then placed in disk $44_d$. These data are maintained throughout the monthly statement cycle. Subsequently, this master file can be deleted after one monthly statement cycle has been printed; and then a new one may be created.

In the overall summary, check documents are imaged into digital image data and placed in the Storage/Retrieval Modules 10 (SRM), then transferred to optical platters $50_p$ in the jukebox $50_j$ via Archive Server 30.

The system creates an "Initial Print Index File" (FIG. 6B) from IDS disk 7 (FIG. 1A) with detailed checking data in digital form.

The Archive Server 30 "merges" its Archive Index (of each dated digital image entry with its location of platter number and record number) with the Initial Print Index File to develop the "Merged Master Print Index File" in the Archive Subsystem 50.

The Archive Server 30 and Archive Disk $30_d$ accumulate data in the Merged Master Print Index File to cover a 30-day monthly period (of 22 business banking days).

The Archive Server 30 extracts and copies one day's worth of index records, of its accumulated 30 days of data, into the Magnetic Disk $44_d$ of the Print Subsystem 42 (FIG. 1B).

The Print Server 44 "sorts" (FIG. 6C) the account numbers in the Merged Master Print Index File (holding one day's worth of the 30 days of data) to develop a set of sequential account numbers for each date of the 30-day cycle together with correlated data indicating (for each check document) the location of the platter and record number of image data now residing in disk $44_d$ (which was copied from the jukebox $50_j$.

Then the Print Subsystem 42 prints out N statements each day where N is equal to 1/22 of the total number of customer accounts.

FIG. 4 indicates a second alternative configuration which uses a specialized drive called the LMSI drive together with the jukebox $50_j$. The LMSI 6100 Series may include ten drives and 50 platters which involves one drive and five platters per unit. The LMSI is a unit manufactured by Laser Magnetic Storage International (LMSI) Company located in at 2914 East Katella Avenue, Orange, Cal. 92667.

In the second alternative configuration of FIG. 4, the jukebox $50_j$ showing 120 optical platters is used for archival storage when it is necessary to retain and maintain data for over 30 days. The LMSI 6100 Series drives and platters, designated as 57 and 58 of FIG. 4, are used for the storage and retrieval of data which will only be held for a 30 day period.

Since the LMSI drives have a higher transfer rate and shorter access time, it is possible to speed up the retrieval/sorting and printing processes involved. Thus the check images will be stored in the LMSI based optical platters 57 and 58 (FIG. 4) for a period of 30 days. Subsequently, the information on these platters will be transferred to the jukebox $50_j$ after the statements have been printed.

The assumptions for this configuration are the same as those for the first-mentioned design configuration, except that no time period is required to change platters, since the platters here are always connected with the drives, and the capacity of each platter is 10 GB. Additionally, in this second design configuration (FIG. 4), the drive can seek/read from one side of a platter at a time, even though it has two seek-heads on two sides of the drive.

The following Table VI indicates the specifications that are projected and based on the CYGNET 1800 Jukebox which has a Hitachi Drive.

TABLE VI

| SPECIFICATIONS | LMSI-LD 6100 (AVL 1Q/92) | FORTHCOMING LMSI DRIVE |
| --- | --- | --- |
| Media Capacity | 6.0 GB/Platter | 10 GB/Platter |
| Average Seek Time | 75 ms | 50 ms |

TABLE VI-continued

| SPECIFICATIONS | LMSI-LD 6100 (AVL 1Q/92) | FORTHCOMING LMSI DRIVE |
| --- | --- | --- |
| Average Latency | 25 ms | 25 ms |
| Transfer Rate | 75 KB/sec | 900 KB/sec |
| Seat and Spinup Time | 1.5 sec | 1.5 sec |
| Spindown Time | 1.5 sec | 1.5 sec |
| No. of Seek Heads | 2 | 2 |

PERFORMANCE ANALYSIS:

An analysis similar to that previously done for the first configuration would indicate, in this second configuration (FIG. 4), that the total storage required for 22 days (banking month) would be 438.36 GB. The total "ON-US" item storage for one month would come to 261.81 GB, and the total number of optical platters required for two months storage would be 46 platters.

The total number of images stored on one platter would be 345,454 and the average "ON-US" images per platter would be 207,272 (60% of 345,454).

The average "ON-US" images per daily (1/22 of 207,272) cycle per platter would come to 9,421 images. The ratio of the total number of images to the images retrieved would come to 36.6. This would mean that approximately one in every 37 images would be retrieved.

In order to retrieve one image (on the average), it would require that the system move 37 images, wait for latency, and read the front image. This would take 53.8 millisecond per image when reading the front image.

In order to retrieve images from one side of a platter (4710 images), the read time would involve 0.0538×4710 images which would come to 253.3 seconds, or 53.8 milliseconds per image.

For customer account statements, assuming 18,000 accounts each having 20 checks, and each taking a read time of 53.8 milliseconds, this retrieval would come out to 19,368 seconds or 5.3 hours. Likewise, for commercial accounts, the total time to retrieve the data for 12,500 accounts would come to 4.3 hours.

For the reconciliation accounts, the time to retrieve image data from one side of the platter would come to 20.87 seconds for retrieving 333 images, and this would come 0.0627 seconds per image. Thus, the total time required to retrieve, on a daily basis, 1,000 reconciliation accounts would come to 0.34 hours.

There is no significant time required to transfer all the image data from the archive server 30 to the print server 44.

PRINT FUNCTION ANALYSIS:

Here the retrieval time for a total of 18,000 accounts with 20 checks each would come to 5.3 hours.

SITUATION—OF THREE PAGES PRINTED PER ACCOUNT: this would require the total printing of 54,000 pages and using one printer, this would take 12.5 hours. However, the total clock hours required for the printing would involve 5.3 hours for retrieval time, plus 12.5 hours for printing the 54,000 pages, plus 0.5 hours to sort the 18,000 accounts. This would result in a total of 18.3 hours.

Likewise, for commercial accounts in this second configuration, the total print time would take 8.6 hours, and the reconciliation accounts would take a total print time of 41.6 minutes.

SITUATION—OF FOUR PAGES OF PRINTING REQUIRED PER ACCOUNT: here the total number of pages required to be printed would be 72,000 pages, and using one printer, this would take 16.6 hours. However, with two printers, this would take 8.33 hours; with three printers, this would take 5.53 hours; and with four printers, this would take 4.15 hours.

The total clock hours required for printing the four-page-per-account situation would involve a total of 22.7 hours.

For commercial accounts requiring four pages per account, this would require the printing of 54,000 pages and the total print time would take 11.57 hours.

Likewise, for the reconciliation accounting using a four-page account print out, the total number of pages would be 4,000, and the total print time would be 55.55 minutes.

FIG. 4 shows how the SRM document image data in $10_i$ are transferred to the archive server 30 which has additional storage on a magnetic disk $30_d$. The archive server can transfer the data to the LMSI drives and platters 57 and 58 which can hold 30-days worth of data. Data which is to be held for longer than 30 days would be transferred to the 120 platters shown in the jukebox $50_j$.

In FIG. 4, the archive server 30 has a small computer systems interface connection (SCSI) to the print server 44 which has an auxiliary magnetic disk $44_d$. Attached to the print server is an image workstation 12 through which an operator can access image data for display. The print server 44 provides and transfers its data to the printer 46 and 48 for eventual printing of the required account information.

FIG. 5 indicates the third format or design configuration for the storage/retrieval and printout system involved herein. This third design configuration involves the storing of the ON-US images and other document images "separately" in the jukebox platters $50_p$, FIG. 5.

As seen in FIG. 5, the jukebox $50_j$ includes two optical storage drives 52 and 54 for storage operations and a third operating drive 56 for retrieval operations. In FIG. 5, the jukebox platters $50_p$ are shown numbered from platter 1 to platter 120. The archive server 30 connects to the storage 52, 54 and the retrieval drives 56. The platters, in addition to being connected to the print server 44 provides output to two image printers, printers 46 and 48.

The storing of documents in the archive subsystem media 50 of FIG. 5 may be done as follows:

(a) The checks are segregated (by code number to identify the group from MICR data) into three groups after the amount entry and the date of correction is done in the ICPS (Image Check Processing System) applications. This is done by the print server software in 44. The three groups into which the checks are sorted are:
   (i) ON-US items (personal and commercial accounts);
   (ii) Reconciliation account items;
   (iii) Transit items (items from other banks which are passing through the local bank);

(b) The complete images of all documents will be sorted in the archive subsystem 50 shown in FIG. 5, within jukebox $50_j$, in the following order:
   (1) ON-US items will be stored in the jukebox via one of the drive units such as 52. The ON-US items are separated from the other items and are stored only in the first 28 optical disk platters which involve the image data only required for a period of 30 days. A total number of 28 disks (60 percent of 46) are required as was previously indicated in the first "worst case" designed configuration. This situation permits increase in performance, as a lesser number of platters are required to handle the sorting of check images.

(2) Reconciliation account items and transit items are stored in the jukebox via a second drive such as drive 54, FIG. 5. The remaining 40 percent of information data (theses are non "ON-US" items such as items related to other outside banks) will be stored in platters numbered 29 through 46 of the jukebox 50$_j$.

PERFORMANCE ANALYSIS FOR THIRD DESIGN CONFIGURATION:

Here the front and back images are located in one file. The following assumptions are made:

1. ON-US statement printing is done at night.
2. The window time for printing is 10 to 12 hours.
3. Printing is done in off-business hours and in a batch mode.
4. The images of the "front" side of the check are printed in actual statements given to the customer.
5. The printer speed is maintained at 90 PPM (pages per minute).
6. The time required to change the optical platters is 6 seconds.
7. The capacity of each of the optical platters is 10 GB.
8. The "front" images are stored together in the same files in the captured order. The front images only are retrieved for printing purposes while the back images are held in storage.

The following Table VII indicates the specifications projected, for the third design alternative of FIG. 5, which are based on a CYGNET 1800 Jukebox with Hitachi drive.

TABLE VII

| SPECIFICATIONS | CYGNET 1800 | FORTHCOMING DRIVE |
|---|---|---|
| Media Capacity | 2.6 GB/Platter | 10 GB/Platter |
| Average Seek Time | 200 ms | 50 ms |
| Average Latency | 50 ms | 25 ms |
| Transfer Rate | 440 KB/sec | 800 KB/sec |
| Seat and Spinup Time | 4.5 sec | 1.5 sec |
| Spindown Time | 3.5 sec | 1.5 sec |

Thus based on the above "forthcoming" specifications, it is possible to estimate the following performance figures.

PERFORMANCE ANALYSIS: The total storage required is for 22 days (a banking month) and this would require 436.36 GB. The total ON-US item storage for one month is 60 percent of this which comes to 261.81 GB. The total number of optical platters 50$_p$ (FIG. 5), required for one month would be 27 optical platters (using a 95 percent effective rate and assuming the effective usage of each platter is 95 percent).

The system will be accessing 54 platters (worst case situation) for every single daily cycle of the statement printing.

The average image size (for the front and back) is 27.5 KB, while the average image size for statement printing of the "front" only would be 17 KB. The total number of images stored in one platter (using the average of 17 KB) would be 345,454, while the total number of images stored on one side of the platter would be 172,727.

The total number of ON-US images on one platter 50$_p$ would be 345,456 while the average of ON-US images per daily cycle per platter would come to 15,702. (This is 345,456 divided by 22 banking days equals 15,702.) This would average out to 7,851 ON-US images per daily print cycle on one side of the platter. The ratio of the total number of images to the number of images retrieved would be 22.0 per platter. This indicates that approximately one in every 22 images will be retrieved.

In order to retrieve one image, on the average, it is necessary to move 22 images, wait for the latency period, and read the front image. This would involve a total of 5 milliseconds plus 25 milliseconds plus 21.25 milliseconds which comes to 51.25 milliseconds per image read. This means that the system moves 19.5 images per second from the disk 44$_d$ to the printers 46, 48.

In order to retrieve images from one side of a platter (holding 7,851 images), it is necessary to drive, seat, and spin-up the drive in addition to spin-down the drive, plus the read time, which leads to an estimate of 0.0516 seconds per image or an average of 51.6 milliseconds per image (retrieval time from one side of a platter).

For customer account statements, the retrieval would involve 18,000 accounts×20 checks per account×0.0516 seconds per image which would entail 5.1 hours.

For commercial accounts, the time to retrieve one document image would average out to 61.25 milliseconds per image. This means that 16.32 images per second are retrieved. Now to retrieve images from only one side of the platter (4,710 images), the time involved would be 61.5 milliseconds per retrieval of an image, on the average. Thus, the total time to retrieve 12,500 commercial accounts each having 20 checks and at the rate of 61.5 milliseconds per image—this would come to 4.2 hours.

For the reconciliation accounts, the process of retrieving images from one side of the platter (1000/3 equals 333 images) and where the total number of platters per cycle (equals 28/22) equals 1.27 equals 3 sides to be accessed, this would come to a total of 23.47 seconds for retrieving 333 images—which comes to 0.0704 seconds per image. Thus, the total time required to retrieve, on a daily basis, 1,000 reconciliation accounts would come to 1,000 accounts×20 items per account×0.0704 seconds which comes to 0.39 hours.

The time required to transfer all the images from the archive server 30 to the print server 44 is negligible and not counted. Thus no additional time is required for images to be transferred to the print server since they are transferred to the print server in the same 5.1-hour retrieval window used for the archives server (during customer account retrieval).

Thus, the time to sort the 18,000 accounts would be only one-half hour.

| | PERFORMANCE SUMMARY | | | |
|---|---|---|---|---|
| Account Type Per CYCLE (Daily) | Print Window with 1 IPTR in Hours | Print Window with 2 IPTR in Hours | Print Window with 3 IPTR in Hours | Print Window with 4 IPTR in Hours |
| DESIGN NO. 1 WORST CASE CONFIGURATION (See FIG. 2) | | | | |

Case 1: Average 3 pages including text [IPTR = Image Printer]

PERFORMANCE SUMMARY -continued

| Account Type Per CYCLE (Daily) | Print Window with 1 IPTR in Hours | Print Window with 2 IPTR in Hours | Print Window with 3 IPTR in Hours | Print Window with 4 IPTR in Hours |
|---|---|---|---|---|
| Consumer | 18.6 | 12.35 | 10.26 | 9.25 |
| Commercial | 13.7 | 9.4 | 7.96 | 7.25 |
| Reconciliation | 1.60 | 1.26 | 1.14 | 1.09 |
| *Case 2: Average 4 pages including text* | | | | |
| Consumer | 22.7 | 14.4 | 11.63 | 10.25 |
| Commercial | 16.67 | 10.88 | 8.9 | 7.99 |
| Reconciliation | 1.47 | 1.19 | 1.10 | 1.02 |
| DESIGN NO. 2 USING LMSI DRIVE CONFIGURATION (See FIG. 4) | | | | |
| *Case 1: Average 3 pages including text* | | | | |
| Consumer | 18.3 | 12.05 | 9.96 | 8.95 |
| Commercial | 13.4 | 9.1 | 7.66 | 6.95 |
| Reconciliation | 1.52 | 1.18 | 1.06 | 1.01 |
| *Case 2: Average 4 pages including text* | | | | |
| Consumer | 22.4 | 14.1 | 11.33 | 9.95 |
| Commercial | 16.37 | 10.58 | 8.6 | 7.69 |
| Reconciliation | 1.39 | 1.11 | 1.02 | 1.01 |
| DESIGN NO. 3 STORING ON-US AND TRANSIT ITEMS SEPARATE IN THE JUKEBOX (See FIG. 5) | | | | |
| *Case No. 1: Average 3 pages including text* | | | | |
| Consumer | 18.1 | 11.85 | 9.76 | 8.75 |
| Commercial | 13.3 | 9.0 | 7.56 | 6.85 |
| Reconciliation | 1.57 | 1.23 | 1.11 | 1.06 |
| *Case No. 2: Average 4 pages including text* | | | | |
| Consumer | 22.2 | 13.9 | 11.13 | 9.75 |
| Commercial | 16.27 | 10.48 | 8.5 | 7.59 |
| Reconciliation | 1.44 | 1.16 | 1.07 | 0.99 |

Described herein has been a versatile and flexible document image storage and retrieval system suitable for groups involved with massive amounts of transactions which have to be stored, retrieved, displayed, corrected and amended, and printed out on a regular basis.

One typical archival storage and retrieval system described herein can store, for example, 400,000 accounts (mid-size bank) and on each day of the banking month (of 22 days) sort the stored image data from 18,000 accounts, retrieve them, and then print them in multiple-page statements for each account. Each account will involve transactions of checks involved in each account for over the last 30-day period. This sorting, retrieving and printing can be accomplished as with time frames such as:

For one printer, the complete cycle would take 18.6 hours per day for a three-page statement, and 22.7 hours per day for a four-page statement; with two printers, the complete transaction would take only 12.35 hours for a three-page statement and 14.4 hours for a four-page statement; with four printers, the entire cycle would be accomplished in 9.25 hours per day for a three-page statement and 10.25 hours per day for a four-page statement.

A major advantage of this system is that formerly used sorting methods would have required 10-20 hours alone just for the sorting while the present system requires one-half hour or less for the sorting. This is due to the fact that no check images are sorted, but rather only the index numbers of the images are sorted, thus saving long, drawn-out time periods such as were required for the old sorting systems. The Print Index Files are short, fixed records and very easy to sort as compared with older systems which have variable records and involve large database records for each check image.

While the described system is capable of variable configurations, it should be understood that the invention is encompassed by the following claims:

What is claimed is:

1. In a document image capture and storage system, which transforms original bank check documents into digital document image data items, an archival storage, retrieval and printing subsystem comprising:
   (a) archival storage means for storage of said digital document image data items captured over a 2 month period;
   (b) retrieval means for retrieval of 2 months accumulation of said image data items of said stored digital document image data items;
   (c) temporary storage means for temporary storage of one (1) days accumulation of said items;
   (d) sorting means for organizing said one days accumulation into a sequentially ordered file;
   (e) printing means for printing copies, on a daily basis, of said digital document image data items in said sequentially ordered file.

2. The subsystem of claim 1 wherein said archival storage means includes:
   (a) optical drive and platter means for 2 months storage of said digital image data items;
   (b) archival server means for transmitting said digital image data items to said optical drive and platter means and also for receiving selected digital image data items retrieved from said platter means for transmittal to a print server means.

3. In a document processing system for capturing 2N days of bank checks where N is a monthly cycle of business days, and storing digital images of bank checks being processed, and for retrieving and printing out copies of selected documents, a method of organizing digital data and printing out humanly recognizable bank statements summarizing an N day period, comprising the steps of:

(a) converting captured bank checks into digital image data items;
(b) storing said digital image data items covering a 2N day period on optical platters in a jukebox unit at selected platter numbers and record numbers;
(c) storing, in an archive server means, locational data of said optical platter number and record number for each said digital image data item for an N day period to form an Archive Server Index File;
(d) storing information-and-identification indicia, having fields for (i) capture date of bank check; (ii) customer account number; (iii) check number; (iv) amount of check; for each bank check captured, to form an Initial Index File;
(e) merging said Initial Index File with said Archive Server Index File to form a Master Print Index File which correlates the location of each digital image data item with its information-and-identification indicia;
   (e1) accumulating data into said Master Print Index File over said N period of days for said archival server means;
   (e2) copying said N day period of said Master Print Index File into a print-server means;
(f) sorting said Master Print Index File to develop a Sequential-list Index File in a print-server based on said customer account number and check number indicia of each said digital image data items;
(g) printing out monthly cycle customer account statements and humanly recognizable copies of captured bank checks for each one of multiple numbers (M) of bank customers where M is on the order of thousands of customers.

4. A storage/retrieval and printout system holding data items covering a 2N day period where N represents a monthly business period of N days, said system for capturing digital images of original bank checks having identification indicia of capture date, customer account number, check number and fiscal amount of check, the combination comprising:
   (a) first means for converting images of said original bank checks into digital image data items;
   (b) second means for optical platter storage of each of said digital image data items at a specific platter number and record number location to provide location-data for bank checks covering a 2N day period;
   (c) third means for correlating said identification-indicia of each digital image data item with its location-data to form a Master Print Index File for an N day period;
   (d) fourth means for sorting and storing said Master Print Index File in a numerical sequence using said customer account number in said document identification indicia;
   (e) fifth means for printing copies of said original bank checks and customer monthly account statements of said sorted numerical sequence of said Master Print Index File, said fifth means including:
      e1) means for printing out said customer monthly account statements on a daily basis over N days such that each days output is 1/N customer statements completed and the N day period will complete one monthly statement for each customer.

5. The combination of claim 4 wherein said second means includes:
   (a) jukebox means having multiple optical platters for storage of said digital image data items.

6. The combination of claim 5 wherein said jukebox means includes:
   (a) first drive means for storing said digital image data items on said optical platters;
   (b) second drive means for retrieving said digital image data items from said optical platters.

7. The combination of claim 4 wherein said fourth means includes:
   (a) print server means for developing a sequentially sorted Print Index File holding a fractional portion of 1/22 of the total digital image data items accumulated over a 22-day work period.

8. The combination of claim 7 wherein said print server means includes:
   (a) print server magnetic disk means for temporary storage of said fractional portion of digital image data items.

9. The combination of claim 4 wherein said third means includes:
   (a) correlation means including:
      (a1) system disk means for storing an Initial Index File of identification indicia for each captured bank check;
      (a2) an Archive Server File which holds the platter number-record number location for each digital image data item stored in said optical platters;
      (a3) merging means to combine said Initial Index File with said Archive Server File to develop a Master Print Index File, for transfer to said fourth means.

10. A storage/retrieval and statement printout system for bank check document digital image data items storing 2 months of such data an optical platter media holding "2M" digital image data items where M represents a month's accumulation of data items, said system comprising:
   (a) system magnetic disk means for storing information-and-identification-data associated with each check document processed, to form an Initial Index File;
      (a1) optical jukebox platter means for storing said 2M data items representing a two month period of customers bank checks processed by a bank or financial institution;
   (b) archive server means for maintaining location-data, in an Archive Server Index File, which specifies the optical platter number and record number of each check document's digital image data items' location, for an accumulated M items covering a single month period, said archive server means including:
      (b1) merger means for correlating said Initial Index File and said Archive Server Index File into a Master Print Index File of M data items;
      (b2) means to transfer on a daily basis, said Master Print Index File to a print server means;
   (c) said print server means for temporarily storing one days portion of said Master Print Index File and including:
      (c1) sorting means for sequentially listing said Master Print Index File into a Numerical Sequence Index File;
      (c2) retrieval means for storing one days portion, M/N of said check document digital image data items in the sequential listing order of said Numerical Sequence Index File where M/N is a single day printout portion of the total M number of check document digital image item stored on said optical platter means, and N is the number of business days in a month;

(c3) print means for printing humanly readable copies of said bank document digital image data items in said Numerical Sequence Index File to provide a daily printout of M/N customer bank statements.

* * * * *